(12) United States Patent
Spencer

(10) Patent No.: US 7,058,735 B2
(45) Date of Patent: Jun. 6, 2006

(54) METHOD AND APPARATUS FOR LOCAL AND DISTRIBUTED DATA MEMORY ACCESS ("DMA") CONTROL

(75) Inventor: Thomas Vincent Spencer, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 329 days.

(21) Appl. No.: 10/452,330

(22) Filed: Jun. 2, 2003

(65) Prior Publication Data

US 2004/0243739 A1    Dec. 2, 2004

(51) Int. Cl.
*G06F 13/00* (2006.01)

(52) U.S. Cl. .............................. 710/24; 710/6; 710/22; 710/52; 712/225; 712/245

(58) Field of Classification Search ................ 710/5–6, 710/20, 22, 69, 24, 52–61; 707/10, 102; 711/220; 715/863; 712/200–245
See application file for complete search history.

(56) References Cited

U.S. PATENT DOCUMENTS

| | | | |
|---|---|---|---|
| 4,320,453 A | | 3/1982 | Roberts et al. |
| 5,301,322 A | | 4/1994 | Hamanaka et al. |
| 5,379,381 A | * | 1/1995 | Lamb ............................ 710/6 |
| 5,524,212 A | | 6/1996 | Somani et al. |
| 5,619,728 A | * | 4/1997 | Jones et al. .................... 710/27 |
| 5,644,784 A | * | 7/1997 | Peek ............................ 710/24 |
| 6,025,925 A | | 2/2000 | Davidson, Jr. et al. |
| 6,199,121 B1 | * | 3/2001 | Olson et al. .................. 710/24 |
| 6,240,358 B1 | | 5/2001 | Kawai |
| 6,282,195 B1 | | 8/2001 | Miller et al. |
| 6,324,599 B1 | * | 11/2001 | Zhou et al. .................... 710/26 |
| 6,341,318 B1 | * | 1/2002 | Dakhil ........................ 710/23 |
| 6,370,622 B1 | | 4/2002 | Chiou et al. |
| 6,434,590 B1 | | 8/2002 | Blelloch et al. |

(Continued)

OTHER PUBLICATIONS

"The Amulet environment: new models for effective user interface software development" by Myers, B.A.; McDaniel, R.G.; Mille R.C.; Ferrency, A.S.; Faulring, A.; Kyle, B.D.; Mickish, A.; Klimovilski, A.; Doane, P. (abstract only) Publication Date: Jun. 1997.

(Continued)

*Primary Examiner*—Christopher Shin
(74) *Attorney, Agent, or Firm*—Morrison & Foerster LLP

(57) ABSTRACT

An apparatus for local direct memory access control includes a processor unit for generating a direct memory access designator when needed data is not available and continuing processing which does not require the unavailable data. A memory access designator holder receives the memory access designator, and a local data memory access controller performs a data memory access transaction in accordance with the content of a descriptor. Staging registers hold components of a data memory access designator and transfer the components to a selected portion of the data memory access designator holder. The data memory access controller transfers the contents of the staging registers to the data memory access designator holder when one of the staging registers is written to by the processor unit. The processor unit stalls if a write to the staging register occurs when the data memory access designator holders contain a data memory access designator, and ceases the stall when one of the plurality of data memory access designator holders ceases to contain a data memory access designator.

18 Claims, 5 Drawing Sheets

U.S. PATENT DOCUMENTS

| | | |
|---|---|---|
| 6,499,892 B1 | 12/2002 | Beggiao |
| 6,535,958 B1 | 3/2003 | Fuoco et al. |
| 6,668,287 B1 * | 12/2003 | Boyle et al. ................. 710/22 |
| 2004/0024969 A1 | 2/2004 | Chauvel et al. |
| 2004/0098575 A1 | 5/2004 | Datta et al. |

OTHER PUBLICATIONS

"Self-tuning fuzzy logic controller for reactive navigation" by Mondelli, G.; Castellano, G.; Attolico, G.; Stella, E.; Distante, A. (abstract only) Publication Date: Sep. 19-20, 1996.

* cited by examiner

METHOD AND APPARATUS FOR LOCAL AND DISTRIBUTED DATA MEMORY ACCESS ("DMA") CONTROL

RELATED APPLICATIONS

This application is related to previously filed U.S. patent application Ser. No. 10/402,182 entitled "Hardware Assisted Firmware Task Scheduling and Management," and Ser. No. 10/401,459 entitled "Local Emulation of Data Ram Utilizing Write-Through Cache Hardware Within a CPU Module," both assigned to the same assignee as the present application.

BACKGROUND OF THE INVENTION

Host bus adapters are well known in the art, e.g., for establishing and maintaining an interface between a very fast bus, e.g., a fibre channel and a host computer and/or local network of host computers. They function to perform many tasks, e.g., reassembling and checking the correctness of packets of communicated information received over the input channel, e.g., a fibre channel and, e.g., serializing the data for transmission to the host computer, e.g., over a serial bus to the serial bus port of the host computer, and the like. As the communication channels are becoming even more capable of increasing the bit transmission rate ("BTR") there is a need for a new architecture for a host bus adapter, particularly one implemented on a microchip.

SUMMARY OF THE INVENTION

A method and apparatus for local direct memory access control is disclosed which may comprise a processor module having a direct memory access control apparatus which may comprise: a processor unit adapted to generate a direct memory access designator when in a condition of needed data not being available and to thereafter continue processing which does not require the not available data; a memory access designator holder contained within the processor module and adapted to receive and hold the memory access designator; and, a local data memory access controller contained within the processor module and adapted to carry out a data memory access transaction in accordance with the content of the descriptor. The memory access designator holder may be adapted to hold a plurality of memory access designators each associated with a memory access transaction and adapted to present each of the plurality of memory access designators to the local data memory access controller successively. The apparatus may further comprise a plurality of staging registers each adapted to hold at least one component of a data memory access designator and adapted to transfer the at least one component of the data memory access designator to a selected portion of the data memory access designator holder. The data memory access designator holder may be one of a plurality of data memory access designator holders arranged in a first-in-first-out configuration. The data memory access controller may also be adapted to transfer the contents of the respective plurality of staging registers to the data memory access designator holder when a selected one of the staging registers is written to by the processor unit. The processor unit may be adapted to stall if a write to the selected one of the staging registers occurs when each of the plurality of data memory access designator holders contains a data memory access designator and to cease the stall when one of the plurality of data memory access designator holders ceases to contain a data memory access designator.

DETAILED DESCRIPTION OF THE PREFERRED EMBODIMENT

Figure 1:
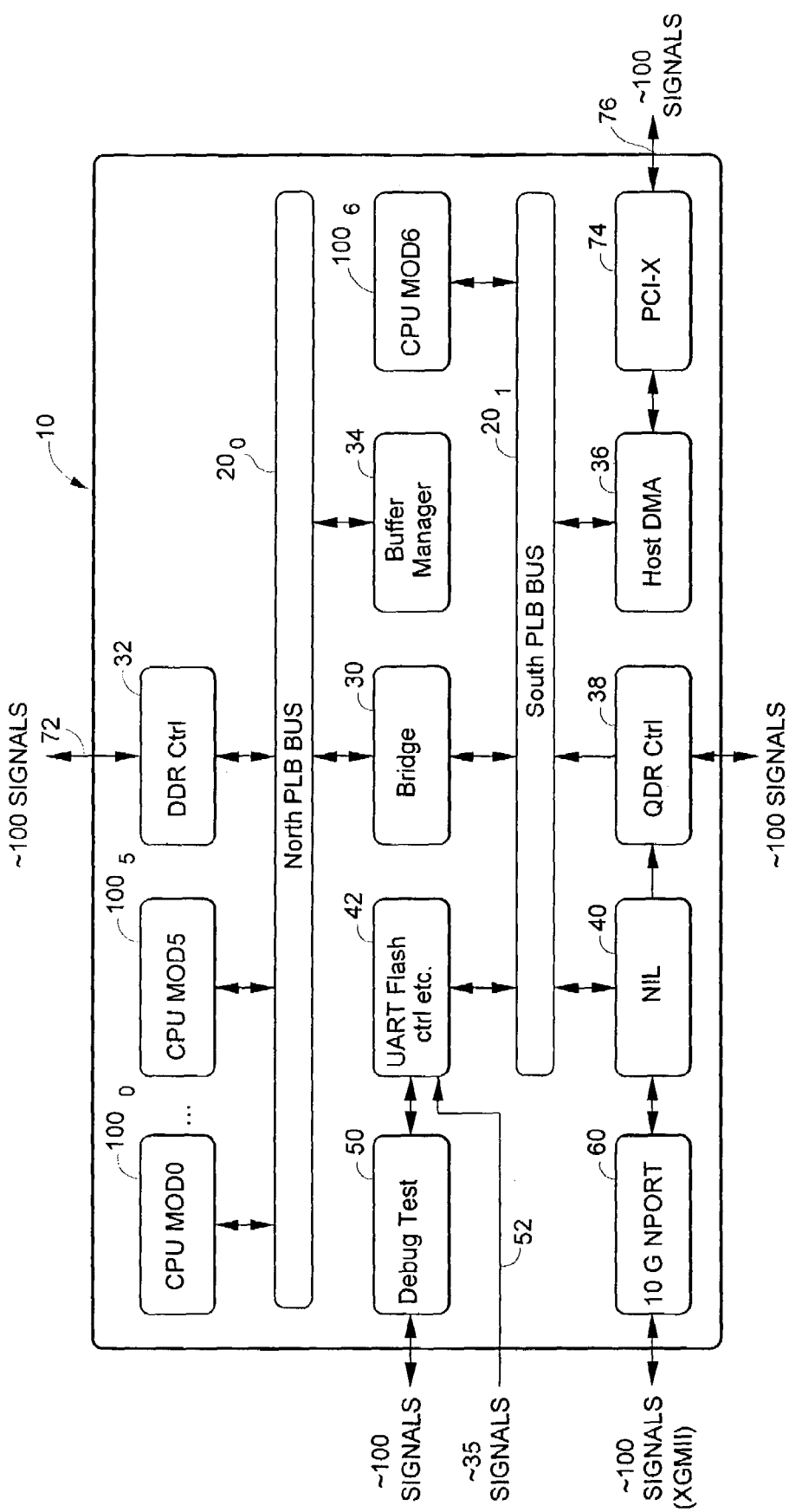
FIG. 1 shows an overall architecture for a system according to an embodiment of the present invention.

Turning now to FIG. 1 a host bus adapter system 10 according to an embodiment of the present invention, which may be located on a single integrated circuit (chip) may include a plurality of CPU modules, e.g., $100_0$–$100_5$, which may be connected a common bus, which may be e.g., a standard processor local bus ("PLB") $20_0$, which for convenience will be referred to as the north PLB $20_0$. Also connected to the PLB $20_0$ may be a bridge 30 to a south PLB $20_1$. Also connected to the PLB $20_0$ may be a double data rate memory controller DDR 32 and a buffer manager 34. Connected to the PLB $20_1$ may be a CPU module $100_6$ a host DMA 36, a quad data rate memory controller ("QDR") 38 which can be an SRAM controller, an N-Port Interface Layer 40 for a standard fibre channel N-Port and a universal asynchronous receiver/transmitter ("UART") 42, which may include a flash memory controller, etc. As is well known in the art, a UART, ordinarily on a microchip or a part of a microchip, can contain programming or be otherwise operated under program control to control a computer's (processor's) interface, e.g., to its attached serial devices. Specifically, it can provide the computer with an interface, e.g., an EIA standard RS-232 (C) data terminal equipment ("DTE") interface so that it can "talk" to and exchange data with modems and other serial devices. As part of this interface, a UART usually also can convert the bytes it receives from the computer along parallel circuits into a single serial bit stream for outbound transmission and vice-versa for inbound traffic, add a parity bit (if it's been selected) on outbound transmissions and check the parity of incoming bytes (if selected) and then discard the parity bit, add start and stop delineators on outbound traffic and strip them from inbound transmissions, handle interrupts from the processor and/or its other input devices, e.g., keyboard/mouse, which are serial devices with special ports, and handle other kinds of interrupt and device management that require coordinating the computer's (processor's) speed of operation with device speeds. The UART 42 may also provide some amount of buffering of data so that the computer (processor) and serial devices data streams remain coordinated. The specific UART 42 can be a standard cell, e.g., an IBM module emulating a 16550, which has a 16-byte buffer that can get filled before the computer/processor needs to handle the data.

Connected to the UART 42 may be a debug/test unit 50 and an input/output 52 for 35 signals for interfacing the UART and flash control, e.g., to a terminal device. Connected to the NIL 40 may be an input/output signal port 60, e.g., a 10 gigahertz N port, which in turn has connected to it a chip signal input/output 60, e.g., to a fibre channel communication link. The same signals may also be received on an input to the debug/test unit 50. Connected to the DDR SDRAM controller 32 is an input/output port 72 that may be connected to DDR SDRAM memory. Connected to the QDR controller 38 is an input output connection that may be connected to SRAM memory. Connected to the host DMA 36 may be a host interface, e.g., a PCI-X host interface 74 connected to a host input/output signal connection from the chip 10 to the host computer, e.g., over a PCI bus interface 76.

Figure 2:
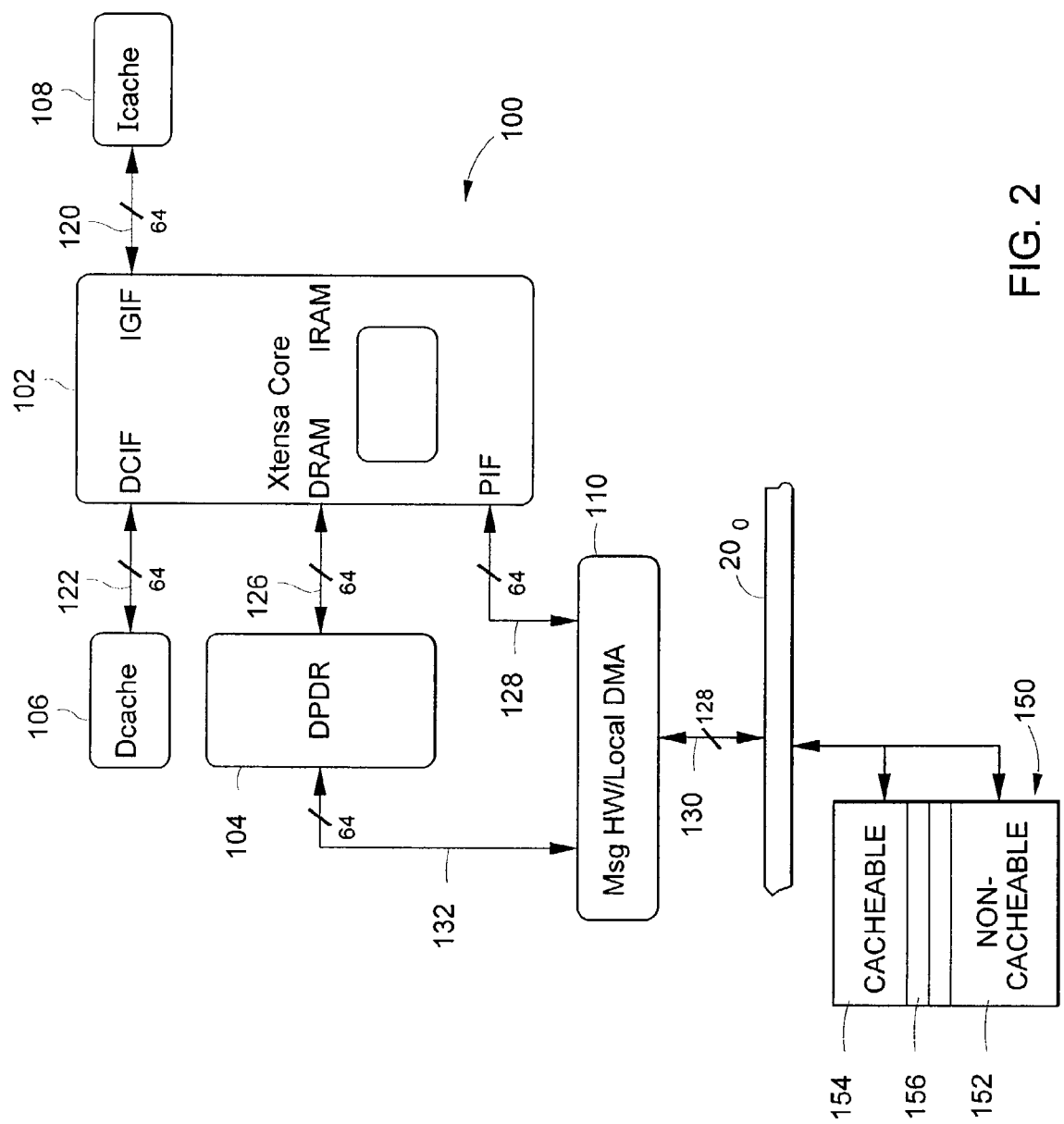
FIG. 2 shows an architecture for a CPU module contained on the chip containing the system of FIG. 1.

Turning now to FIG. 2 a CPU module 100 according to an embodiment of the present invention is shown in more detail. The CPU module 100 is a key component of an embodiment of the present invention. The CPU module 100 may consist of a standard embedded CPU core 102, such as the Xtensa that is available from Tensilica, local memories, which may include both a dual ported data ram ("DPDR") 104, a data cache ("DCache") 106 and an instruction cache ("ICache") 108, a CPU bus/memory interface ("CPU-IF") 110, which may in turn include a local data memory access ("LDMA") controller and local message and task queuing functionalities as explained in more detail below. The Xtensa core 102 itself contains all of the Tensilica Instruction Extension ("TIE") instructions.

The ICache 108 may consist of, e.g., a 32K direct mapped cache memory contained on the chip 10 with the CPU 102 and connected to the CPU 102 by, e.g., a 64 bit wide ICache bus 120. The DCache 106 may consist of, e.g., a 4K direct mapped cache memory contained on the chip 10 with the CPU 102 and connected to the CPU 102 by, e.g., a 64 bit wide DCache bus 122. The DPDR 104 may be, e.g., a 20K bit RAM contained on the chip 10 with the CPU 102 and connected at one port (A) to the CPU 102 by, e.g., a 64 bit DPDR/CPU bus 126 and at the other port (B) to the CPU-IF 110 by a DPDR/CPU-IF bus 132. The CPU 102 is also connected to the CPU-IF 110 by a CPU/CPU-IF bus 128 which may also be, e.g., a 64 bit wide bus. The CPU-IF 110 may be connected directly to the PLB. Also contained in each CPU module 100 may be a plurality of, e.g., 32 message queues $202_0$–$202_{31}$ as discussed in more detail below. This design, including, e.g., bus sizes, was selected among a number of possible designs for a variety of reasons including available real estate on the chip 10 and power consumption, with seven CPU modules 100, which may be essentially identical, on the chip 10. It will be understood that other configurations of the CPU module may be possible, an added IRAM external to the core and larger buses, e.g., all 128 bits wide. Also connected to the PLB may be an external memory 150, which may be, e.g., a 4G memory, which may be, e.g., broken down into 2G of cacheable memory space 154, and 2G of non-cacheable memory space 152, and may include a specifically set aside RAM emulation address space 156, e.g., within the cacheable portion 154.

In order to maximize the design for mean time between failure from, e.g., soft error rate, the local memories may support byte error correction coding ("ECC") on, e.g., the DPDR 104, while the DCache 106 and the ICache 108 may be validated based upon a parity error scheme, both as are well known in the art.

Figure 3:
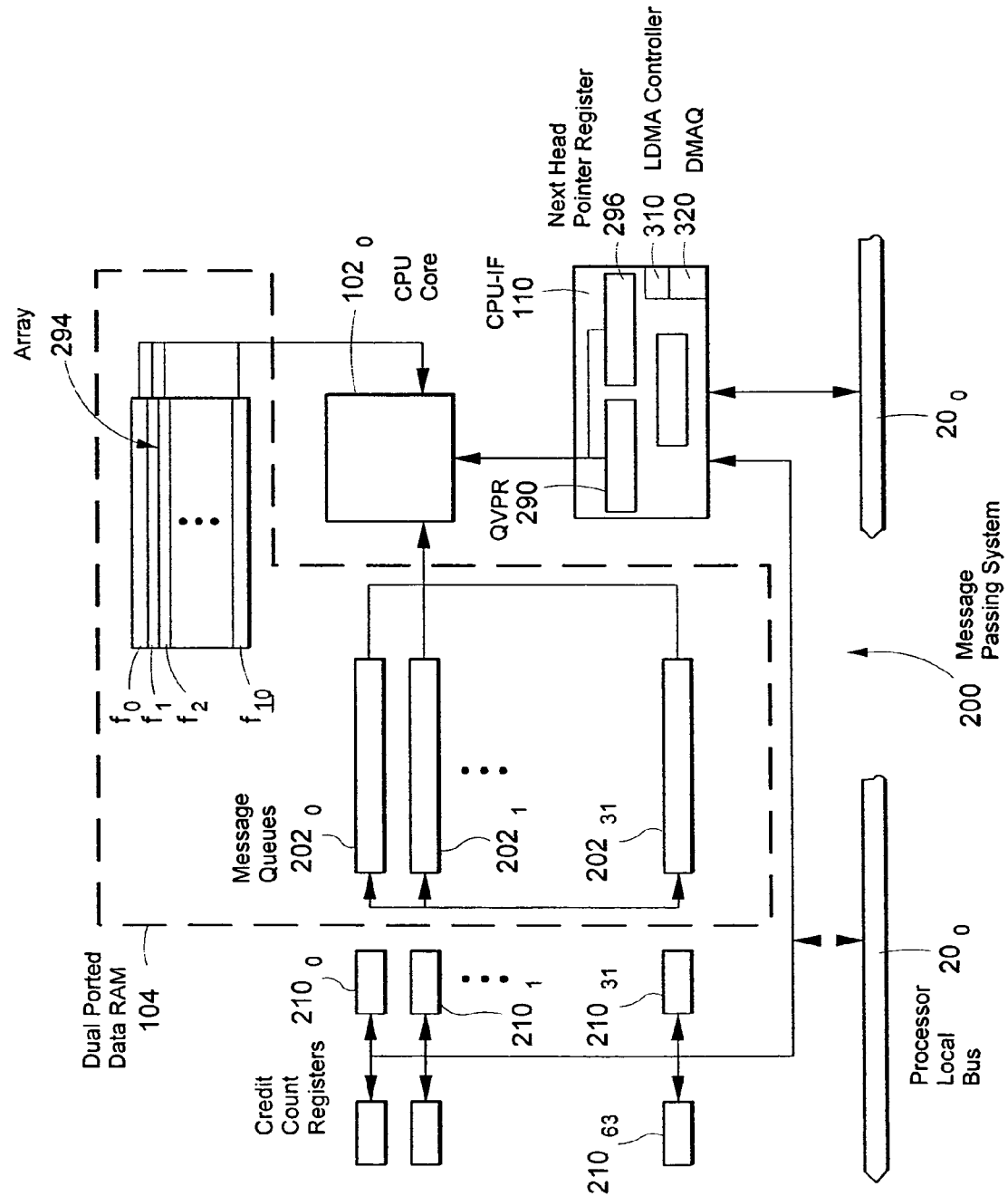
FIG. 3 shows a more detailed view of portions of the CPU module of FIG. 2.

Message Passing. Turning now to FIG. 3 there is shown a message passing system 200 according to an embodiment of the present invention. Each CPU module $100_0$–$100_6$ may include hardware in the message passing system 200 to support low-overhead passing of messages. The message system 200 may include a plurality of message queues, e.g., 32 message queues $202_0$–$202_{31}$. The message system 200 may be optimized but not limited to for a single producer, e.g., a single CPU module $100_0$, sending messages to a single message queue, e.g., message queue $202_0$ in CPU module $100_1$. Multiple producers to the same set of queues $202_0$–$202_{31}$ may be implemented, but such a design under all the circumstances of the embodiments disclosed in this application may not perform as well as a plurality of sets of queues. Messages may originate from other CPU modules $100_0$–$100_6$ on the chip 10, local DMA engines within the respective modules 100 or DMA from other third parties on the chip 10, i.e., units other than CPU modules $100_0$–$100_6$. The sender, as described in more detail below, is always responsible for not overflowing the target message queue $202_0$–$202_{31}$. This may be accomplished, as explained in more detail below, by utilizing, e.g., a credit-based scheme using, e.g., a plurality of credit count registers ("CCRs") 210 provided in each CPU module 100. In some cases, however, the flow-control may be inherent in the firmware and the CCRs 210 may not be necessary.

Each CPU module 100 may have 32 message queues $202_0$–$202_{31}$ that may be supported by, e.g., some of 64 local CCRs $210_0$–$210_{63}$. A message queue, e.g., $20_{20}$ may consume a local CCR, e.g., CCR $210_0$, e.g., if notification is required for that queue $202_0$. The local queue $202_0$ may also consume a remote CCR 210, e.g., a CCR 210 in another CPU module 100, if hardware assist is required for flow control. Therefore, in the typical application, e.g., two CCRs 210 are consumed for each message queue 202. For example, one CCR 210 may be utilized on the sender CPU module $100_0$ for tracking credits available to the sender CPU module $100_0$ and one on the receiver CPU module $100_0$ for counting messages received in the respective message queue $202_0$ associated with the receiver CPU $100_1$. The size and location of each message queue $202_0$–$202_{31}$ may be made programmable, but ordinarily will be a multiple of 16-bytes and may be in the present embodiment of the present invention not more than 4KB in size. Message queues $202_0$–$202_{31}$ for each CPU 102 may be arranged in memory, e.g., the DPDR 104 for each respective CPU 102, to start at any 16-byte aligned address in the DPDR 104.

Messages can be designated as fixed-length or variable-length on a queue-by-queue basis. The firmware, e.g., in association with the CCRs $210_0$–$210_{63}$ may handle credits differently for the two types of message formats, and also dependant upon whether the CCR is in a sender CPU 1000 or a receiver CPU 1001. For example, hardware may maintain a tail pointer as part of storing the message into the respective message queue $202_0$–$202_{31}$ within the respective DPDR 104. Hardware may also, e.g., maintain a header pointer but some support will be required from the firmware in this event. For example, the lower 8-bits of the first 32-bit word of any variable-length message may contain the length of the message, e.g., specified in 32-bit words. This would imply a maximum message length of 1K bytes. The length of fixed-length messages may be specified by the firmware, e.g., as configured in a queue configuration register, discussed in more detail below. Messages may be broken up over multiple transactions, e.g., between a sender CPU $100_0$ to a receiver CPU $100_1$, but the message must be the exact length specified. Notification for the receipt of the message, e.g., by the receiver CPU $100_1$ to the sender CPU $100_0$ may be required to be given only after the entire message has been received by the receiver CPU $100_1$.

There may also be cases where a message may "wrap" back within the memory space allocated to a given message queue $202_0$–$202_{31}$ to the beginning of the message queue $202_0$–$202_{31}$ in the middle of the message. The firmware may also specify the maximum size message that the hardware can guarantee not to wrap. If the firmware allows wrapping of messages in a respective message queue $202_0$–$202_{31}$ then the firmware will also have to detect and deal with this case. If there is not room for the entire message at the end of a message queue the hardware will place the entire message at the beginning of the queue $202_0$–$202_{31}$. Message wrapping must also be considered when determining the appropriate number of credits to be assigned to each message queue $202_0$–$202_{31}$.

Message Notification. Each CCR $210_0$–$210_{63}$ has a notification control register that can be used to specify the conditions where notification will be requested. If notification is being requested, the CCR $210_0$–$210_{63}$ will attempt to win notification arbitration by asserting its arbitration request signal. The firmware may create an array of "queue vectors," normally somewhere in the DPDR 104. Each queue vector is a pointer to a data structure $f_0$–$f_n$, in an array 294 of data structures $f_0$–$f_n$, each of which can contains the necessary information to process that particular queue $202_0$–$202_{31}$. Hardware will select the winner of notification arbitration and place the address of a queue vector for that queue $f_0$–$f_n$ into a queue vector pointer register ("QVPR") 290. If there is currently nothing to do, the contents of an NOP offset vector pointer register will be copied into the QVPR 290. Processing the NOP vector will result in reading the QVPR 290 again.

The QVPR 290 may contain the address of a queue vector base field, qvec_base, e.g., in bits 31:9 and a queue vector offset field, qvec_offset, e.g., in bits 8:2, with bits 1:0 set to zero. The QVPR 290 may be initialized to all zeros, e.g., at power up. The NOP vector offset register can contain an NOP offset, nop_offset, e.g., in bits 6:0, with the rest of the bits in the register reserved.

If notification is enabled for a CCR $210_0$–$210_{63}$ the respective CCR $210_0$–$210_{63}$ will attempt to notify the local CPU $102_0$–$102_6$ anytime the respective CCR $210_0$–$210_{63}$ count is non-negative. The CCRs $210_0$–$210_{63}$ may be implemented as 10-bit counters so the number is considered to be negative if the MSB bit 9 ("sign bit") is asserted. The CCRs $210_0$–$210_{63}$ may be sign-extended on reads. Notification normally can be in the form of hardware arbitration. Notification may also be specified to be an interrupt to the local CPU $100_0$ or $100_6$ or simply asserting a bit in a notification poll register, as discussed below.

Notification arbitration may be divided into four different arbitration groups. Each CCR $210_0$–$210_{63}$ that is participating in notification arbitration may be assigned to one of the arbitration groups. The relative arbitration priority may be specified between the different groups, i.e., each group may be given a priority class, which also may be, e.g., one of four possible classes. Therefore, the group for each CCR $210_0$–$210_{63}$ may be specified in its notification configuration register. The class for each arbitration group is specified in the arbitration group control register. Simple round-robin arbitration may be performed within each arbitration group, each such CCR $210_0$–$210_{63}$ within each such arbitration group, by definition, being of the same priority class. Each arbitration group can be dynamically enabled or disabled from the arbitration process by the setting of an arbitration enable bit in the arbitration group enable register during normal operation without impacting the fairness within an arbitration group.

Head Pointer Management. Each CPU module $100_0$–$100_6$ may contain hardware support for managing such things as messaging, e.g., by managing such things as message queue head pointers, e.g., within CPU bus/memory interface 110.

The firmware may, e.g., read the next head pointer register 296 to get, e.g., an address of the first word of a message. The firmware may be configured to create the next head pointer by writing the length of the current message to an update head pointer register. Hardware can then, e.g., calculate the next head pointer and store the value back. Accesses to the next head pointer register 296 and the update head pointer register may be made after reading the QVPR 290 or writing to an arbitration results register, as discussed below.

Flow Control. Message queue $202_0$–$202_{31}$ flow control may be configured to be exclusively under firmware control. The hardware provides credit-counting registers ("CCRs"), e.g., CCRs $210_0$–$210_{63}$ which may be utilized to assist in credit management if necessary, as explained in more detail below. In some cases, flow control may be implicit in the protocol for some message queues $202_0$–$202_{31}$ and credit-based flow control will not be required as to those respective ones of, e.g., the message queues $202_0$–$202_{31}$. If required, however, the credit scheme may be used as part of the message flow control for the message queues $202_0$–$202_{31}$. A credit can represent some amount of physical storage in the message queue $202_0$–$202_{31}$. The message producer must never send a message unless it has enough credits. For a fixed-length message, it is most efficient to have one credit represent the storage required for one message. For variable-length messages, however, a choice for the representation of amount in a credit may be, e.g., two words (8-bytes) of queue $202_0$–$202_{31}$ storage. Two words is a good choice because in the described embodiment this is can also be selected as the smallest unit of storage ever consumed when storing a message, e.g., in a message queue $202_0$–$202_{31}$ in the DPDR 104. Any message that is an odd number of words in length will consume an extra word of storage because in the disclosed embodiment, e.g., new messages are stored at 8-byte aligned addresses. This message alignment can be taken into consideration when doing flow control and when determining the required size of a queue $202_0$–$202_{31}$. The other parameter that must also be taken into consideration is the effect of hardware wrapping.

There are several registers on each CPU module 100 that may be dedicated to message passing. Some of these registers are located in CPU-IF 110 PIF register space and may have low-latency access time. Others may be located in configuration space and are relatively slower.

Queue Configuration Registers ("QCR"). Each message queue $202_0$–$202_{32}$ may have associated with it a message queue configuration register ("QCR"). Each QCR may be used to specify the size and behavior of each of the respective message queues $202_0$–$202_{31}$. Each of the respective QCRs may normally be configured by the firmware, e.g., at power up and ordinarily does not need to be modified thereafter during operation of the CPU module $100_0$–$100_6$. The fields in each of the respective QCRs may be configured to include the various fields. Each QCR may include a message size field, msg_size, e.g. in bits 7:0, which may be used to specify the maximum message size, e.g., in 4-byte words, that is guaranteed by the hardware not to wrap within the respective message queue $202_0$–$202_{31}$. For fixed-length messages the message size field can also specify the exact length of all messages sent to this queue $202_0$–$202_{31}$. Each QCR may also include a fixed length message field, fixed_len, e.g. in bit 30, which may be used to indicate that all of the messages for the respective message queue $202_0$–$202_{31}$ must be exactly the length specified in the message size field msg_size.

Each QCR may also include a message queue size field, qsize, e.g. in bits 27:20, which may represent the size of the respective message queue with a granularity of multiples of sixteen bytes. The message queue $202_0$–$202_{31}$ may have (qsize+1) 16-byte quad-words. A maximum size may be established, e.g., 4KB that can be configured in the respective QCR. Each QCR may also include a message queue base address field, qbase, e.g., in bits 17:8 of the QCR register in hardware. The message queue base field, qbase, may be used to specify the base DPDR 104 offset for the respective message queue $202_0$–$202_{31}$ which identifies the location of the respective message queue $202_0$–$202_{31}$ within the respective DPDR 104.

Message queues $202_0$–$202_{31}$ can be located, e.g., at any 16-byte aligned address in the respective DPDR 104. Each QCR may also include a CCR increment enable bit ccr_en, e.g., at bit 18, which may be used, when asserted, to cause the respective $CCR_0$–CCR_corresponding to the respective message queue $202_0$–$202_{31}$ to be incremented when a new message has been received. Message queue $202_0$ may be related to $CCR_0$, message queue $202_1$ may be related to $CCR_1$, etc. Each message queue QCR-$210_{31}$ may also have a head pointer enable field, $hptr_{13}$ en, e.g., at bit 19, which may be utilized, when asserted, to cause the $CCR_0$–$CCR_{31}$ corresponding to this message queue $202_0$–$202_{31}$ to be decremented when an update head pointer register is written when the respective queue $202_0$–$202_{31}$ is the most recent winner of notification arbitration, as explained in more detail below.

The message queues $202_0$–$202_{32}$ may be configured to not have direct notification capability. If notification is needed the ccr_en bit must be asserted in the respective message queue configuration register. This causes the respective $CCR_0$–$CCR_{31}$ designated for that respective message queue $202_0$–$202_{31}$ to be incremented by the hardware, e.g., once for each message that is written to the respective queue $202_0$–$202_{31}$. The respective $CCR_0$–CCR_may be configured to have notification capabilities. If the hptr_en bit is asserted in the respective queue configuration register the respective $CCR_0$–$CCR_{31}$ may be decremented by the hardware, e.g., when an update head pointer register is written. If a respective message queue $202_0$–$202_{31}$ is not using its respective $CCR_0$–$CCR_{31}$ ccr_en will be set to 0 and hptr_en will be set to 0. The respective $CCR_0$–$CCR_{31}$, which may be simply a general purpose register within the respective CPU module $100_0$–$100_6$, may be used for other purposes. Most message queues $202_0$–$202_{31}$ will ordinarily need notification and therefore consume a respective local $CCR_0$–$CCR_{31}$. If enabled, notification for arbitration purposes may be configured to be attempted anytime the respective $CCR_0$–$CCR_{31}$ value is non-negative, i.e., the sign bit in the respective $CCR_0$–$CCR_{31}$ is set to 0. The respective queue configuration registers ordinarily are initialized by the firmware prior to receiving any messages, e.g., at power up.

Queue Tail Pointer Registers (TPR). Each message queue $202_0$–$202_{31}$ may maintain a tail pointer register ("TPR") that may contain an address within DPDR 104 where the next word of a next message to be consumed will be stored, once received. These TPR registers may be maintained by the hardware but may also be initialized by the firmware to point to the beginning of the respective message queue $202_0$–$202_{31}$, e.g., at power up. The TPR registers are described in more detail below. Messages are ordinarily stored in a DPDR 104 beginning with an 8-byte aligned address. This can impact the amount of storage required for messages. For example, if a message contains an odd number of words, the respective TPR register will be incremented by hardware to point to the next word prior to receiving the next message. This will be an indication that an extra word was consumed for storing the message. This extra word must be taken into consideration when sizing the message queues $202_0$–$202_{31}$ and when determining the number of credits required to send a message, as explained in more detail below. For example, if a credit is designated by the firmware to represent 1 word of storage in the respective message queue $202_0$–$202_{31}$, it requires 4 credits to send a message of actual length 3. Likewise, if a message queue $202_0$–$202_{31}$ needs to hold eight 5-word messages it would need to be 48 words (8×6) deep.

Each TPR may include a read/write message tail pointer field, tail_ptr, e.g., in bits 14:2, which may be used to specify the location in the DPDR 104 where the next word of the message will be stored once received. This tail pointer field in the TPR register may be initialized by the firmware prior to receiving the first message to point to the base of the respective message queue $202_0$–$202_{31}$. Each TPR may also contain a read/write message word count field, word_cnt, e.g., in bits 23:16, which may be utilized as temporary storage by the hardware to count the number of words in an incoming message. This message word count field may be initialized to Verilog, e.g., 8'h00 eight bits hexadecimal starting at 00 by firmware at power up. Each TPR may also contain a read/write queue wrap indication field, W, e.g., at bit 24, which may be utilized by being toggled by the hardware to indicate each time the hardware wraps a message in the respective message queue $202_0$–$202_{31}$ back to the beginning of the respective message queue $202_0$–$202_{31}$. This queue wrap indication field may be used only to distinguish full from empty, e.g., for message queue overflow detection. The firmware should initialize this bit to 0. Direct access to the TPRs may only be supported at certain times, e.g., at initialization and for test. Direct access while any sort of messages are active may result in undefined behavior.

Credit Counter Registers. Each CPU module $100_0$–$100_6$ may actually contain, e.g., 64 CCRs $210_0$–$210_{63}$. Each CCR $210_0$–$210_{63}$ may be configured to contain a read/write credit count field, credit_cnt, e.g., in bits 9:0, which can be utilized by being incremented or decremented as applicable by the hardware every time a credit is consumed by the receipt of a message or utilized by the transmission of a message. The respective CCR $210_0$–$210_{63}$ may also be sign-extended when read. This is done so the respective CPU $102_0$–$102_6$ will interpret the number as negative any time credit_cnt[9] =1. The credit count field, credit_cnt can contain the number of credits currently available for the designated resource, i.e., that is being serviced by the respective CCR 210.

These CCRs $210_0$–$210_{63}$ may function primarily as counting semaphores and can be used for several different applications in addition to those described above. The first 32 CCRs $210_0$–$210_{31}$ may be slightly specialized in that they can, as discussed above, be logically tied to a respective message queue $202_0$–$202_{31}$ by asserting the ccr_en bit in the CCR enable field of the corresponding queue configuration register for the message queue $202_0$–$202_{31}$. The respective CCR $210_0$–$210_{31}$ may function as a message counter. In this application the respective CCR $210_0$–$210_{31}$ may be incremented by hardware when a message is delivered to the corresponding message queue $202_0$–$202_{31}$. The hardware may also optionally decrement the respective CCR $210_0$–$210_{31}$ that is the winner of notification during arbitration, e.g., when the head pointer field in the update head pointer register is updated by writing to the update head pointer register.

Any of the CCRs $210_0$–$210_{31}$ may be incremented by, e.g., the local DMA controller within the CPU bus interface 110, e.g., upon the completion of a DMA operation. In this application the CCRs 210, e.g., CCRs $210_0$–$210_{31}$, may be used primarily to provide notification to the local CPU $102_0$–$102_6$ when a DMA operation has been completed. For example, prior to initiating a local DMA operation the local CPU $102_0$–$102_6$ could write a DMA completion message directly to a respective one of the message queues $202_0$–$202_{31}$. The respective one of the message queues $202_0$–$202_{31}$ should not have its CCR $210_0$–$210_{31}$ enabled, i.e., no notification of the message will occur. Then the CPU 102 may schedule the DMA with it configured to increment the ccr_n field within the respective one of the CCRs $210_0$–$210_{31}$ upon completion of the DMA operation. In this example a completion message would reside in the respective message queue $202_0$–$202_{31}$ before the DMA is completed and it would not be "delivered" to the local CPU $102_0$–$102_6$ until the DMA operation was complete. This mechanism can also be used effectively if notification of the DMA completion is required but no message is needed. In this case a respective one of the CCRs $210_0$–$210_{63}$ could be used but a respective message queue $202_0$–$202_{31}$ not used.

Any one of the 64 CCRs $210_0$–$210_{63}$ may also be designated, e.g., to provide flow control for a DMA queue ("DMAQ"). In such an application the respective CCR $210_0$–$210_{63}$ may be used primarily to notify the local CPU $102_0$–$102_6$ when room becomes available in the DMAQ for additional DMA operations. When this function is enabled, the respective one of the CCRs $210_0$–$210_{63}$ may be initialized by the firmware to reflect the depth of the DMAQ, e.g., 8 entries. The firmware may perform a read-decrement to the designated CCR $210_0$–$210_{63}$, e.g., to check for available credits, e.g., prior to writing a descriptor to the DMAQ. The designated CCR $210_0$–$210_{63}$ may be incremented by hardware any time a DMA operation completes.

Any CCR $210_0$–$210_{63}$ may also be used to track credits to a respective message queue $202_0$–$202_{31}$. The respective message queue $202_0$–$202_{31}$ may either be local to the respective CPU 102 on the respective CPU module $100_0$–$100_6$ or on a remote CPU module $100_0$–$100_6$. In such an application the firmware should initialize the respective CCR $210_0$–$210_{63}$ to the number of credits available. Ordinarily the firmware on the respective local CPU module $100_0$–$100_6$ will decrement the respective CCR $210_0$–$210_{63}$ by the appropriate number of credits when sending a message. Similarly, ordinarily the firmware on the respective CPU module $100_0$–$100_6$ containing the receiving CPU $102_0$–$102_6$ may increment the respective CCR $210_0$–$210_{63}$ on the respective CPU module $100_0$–$100_6$ containing the sending CPU $102_0$–$102_6$ by the appropriate number of credits once the message has been removed from the respective message queue $202_0$–$202_{31}$ on the respective CPU module $100_0$–$100_6$ containing the receiving CPU $102_0$–$102_6$.

In some instances the sending and receiving CPU 102 may be the same, in which event only CCRs 210 on the same CPU module 100 will be involved. CCRs $210_0$–$210_{63}$ may be considered to be 10-bit signed values. When the value in a CCR 210 is read by a CPU 102 the data will be sign-extended so the CPU will interpret the contents as a negative number if the most significant bit of the CCR credit count field credit_cnt in the respective CCR $210_0$–$210_{63}$, is set to a 1, i.e., the credit_cnt field has been decremented until the sign bit, MSB in the credit_cnt field (bit 9) is set.

CCR Commands. Each CCR $210_0$–$210_{63}$ may be aliased to four different addresses in either the Processor Local Bus ("PLB") $20_0$–$20_1$ address space and or the local CPU-IF 110 register space. A function that may result from each of the possible settings of the bits, e.g., bits 5:4 in a command field within each CCR $210_0$–$210_{63}$ address may be to select four different functions. The cmd field may be derived from 2 bits of the address used to access the respective CCR $210_0$–$210_{63}$. The composition of a CCR $210_0$–$210_{63}$ address may differ, e.g., for a PLB 20 access and a local CPU bus/memory 110 access. The PLB CCR address may include certain bits that are always set or not set to indicate to the firmware that this is a particular kind of address, e.g., a PLB CCR address, e.g., bits 6, 18 and 28:27. The PLB CCR address may also include a CCR number field, ccr_num, e.g., in bits 12:0, that identifies a target CCR $210_0$–$210_{63}$ on a target CPU $102_0$–$102_6$ on a target bus. The PLB CCR address may also include the identify of a target CPU unit in a unit number field, unit_num, e.g., in bits 23:20 and a target bus identification field, bus, e.g., in bits 30:29.

In addition to the normal processor bus/memory interface 110 and PLB 20 direct access to the CCRs $210_0$–$210_{63}$, the hardware and firmware may be configured to allow indirect access, which may be provided, e.g., via a processor bus/memory interface 110 register, e.g., containing the identity of the most recent winner of notification arbitration as the CCR $210_0$–$210_{63}$ being accessed. The address of, e.g., the processor bus/memory interface 110 CCR/NCR register used for such indirect access of the respective CCR $210_0$–$210_{63}$ may contain a notification field bit, i.e., bit 6 in the CCR local address access register is asserted the indirect access will go to the notification configuration register instead of the CCR. The target of an indirect CCR access can also be specified by writing to an arbitration results register. The CCR Local Access address may have certain bits set or not set to indicate to the firmware that it is an address accessible only locally on the respective CPU 100 module from the bus interface 110 side. The local address may have a bit 6 that is set or not to indicate if an indirect access is being made that it should be through the notification configuration register and not the respective CCR. 210.

The four separate functionalities may be used for a read to read contents and for a write to add the written value, or for a read to read the contents and for a write to subtract the written value or for a read to read and decrement and for a write to write the value and finally for a read to read, decrement and lock and for a write to unlock, depending upon the condition of, e.g., bits 5:4. The address for the respective CCR $210_0$–$210_{63}$ can be contained in a seven bit CCR number field ccr_num, e.g., in bits 12:6 indicating the given CCR number within the given target unit that contains the target CCR $210_0$–$210_{63}$ on the given bus. A certain physical CCR $210_0$–$210_{63}$ may always be selected to be CCR $210_0$. For CPUs $102_0$–$102_6$, the unit number may be the same as the CPU $102_0$–$102_6$ number. The access address register can also indicate the bus on which the CCR is, e.g., in a bus field, bus, e.g., in bits 30:29, and can indicate the target CPU unit number, e.g., in a CPU unit number field, unit_num, e.g., in bits 24:20, i.e., up to sixteen units.

Each CCR $210_0$–$210_{63}$ register may be capable of handling a simultaneous access from both sides, i.e., external and local.

A Read/Decrement command will return the contents of the CCR $210_0$–$210_{63}$, and also decrement the CCR $210_0$–$210_{63}$ by 1 unless the CCR $210_0$–$210_{63}$ already contains a −1. The CCRs $210_0$–$210_{63}$ and the firmware may also decrement the CCR $210_0$–$210_{63}$ even if its contents are negative but not −1. A Read/Decrement/Lock command will return the contents of the CCR $210_0$–$210_{63}$ unless the CCR $210_0$–$210_{63}$ is already locked, in which case it will return a −1. The CCR $210_0$–$210_{63}$ will then be decremented by 1 unless a −1 was returned as the read data, which can be because of the lock or because the contents were already −1. The CCR $210_0$–$210_{63}$ will be locked if the content of the CCR $210_0$–$210_{63}$ was actually decremented (i.e. anything but −1 was returned). The CCR $210_0$–$210_{63}$ will remained locked until an unlock command is issued. The Read/Decrement/Lock and unlock commands may be the only commands for which the operation performed responsive to the command is affected by whether the CCR $210_0$–$210_{63}$ is locked or not. Other functions may ignore a locked state of the CCR $210_0$–$210_{63}$ and/or not change the state of the lock bit. The lock bit may only be initialized by doing an unlock operation, and therefore, this should be part of the initialization process.

Indirect CCR Access. In addition to the normal PIF and PLB direct access to the CCRs, indirect access can be provided via a PIF register using the most recent winner of notification arbitration as the CCR being accessed. The address used for indirect access of the CCR may contain a command field cmd, e.g., in bits 5:4, and if bit 6 is asserted the indirect access will go to the notification configuration register instead of the CCR. The target of an indirect CCR access can also be specified by writing to the Arbitration Results Register.

Multiple Producer Support. Single message queues $202_0$–$202_{31}$ with multiple producers potentially writing to the respective message queue $202_0$–$202_{31}$ can be supported by using the lock functionality of the respective CCRs $210_0$–$210_{63}$. For example, when a read/decrement/lock operation is targeted to the respective CCR $210_0$–$210_{63}$ according to the disclosed embodiment it will normally return the contents of the CCR $210_0$–$210_{63}$, e.g., in cases where, e.g., two message producers need to share a message queue and share credits, or possibly other resource sharing, e.g., between CPUs. If the CCR $210_0$–$210_{63}$ is already locked when the read occurs a −1 will be returned (no credit) regardless of the contents of the CCR $210_0$–$210_{63}$ register. The lock function should only be required, e.g., if the transaction that writes the message to the queue $202_0$–$202_{31}$ is not guaranteed to deliver the data atomically. The lock function can be used to, e.g., prevent messages from multiple producers from becoming intermixed by restricting the system to one message at a time. The producer must obtain the lock and credit and then complete all of the write transaction to the respective bus prior to relinquishing the lock. For this mechanism to be effective and simple to configure, usually it requires that all messages be the same length and a single credit represents an entire message. If messages are delivered atomically the CCR $210_0$–$210_{63}$ can still required to obtain credits but the CCR $210_0$–$210_{63}$ may not need to be locked.

Another possible configuration, as an alternative to requiring atomic messages from the performance perspective, could be to distribute the available credits among the multiple producers. For example, if a queue $202_0$–$202_{31}$ is sized for 4 messages with two producers (A and B), device A could be given 2 credits and device B would get two credits. This eliminates the need for a CPU $102_0$–$102_6$ to have to do an external read to obtain a credit. However, in such a configuration the queue $202_0$–$202_{31}$ may be less efficiently used because no one producer is capable of filling the entire queue $202_0$–$202_{31}$. Also, the message consumer has to look at the message content to figure out where to recycle the credit, as explained in more detail below.

Message Notification Registers. A number of registers are utilized for notification of the CPU $102_0$–$102_6$ including the notification control registers, each associated with a respective CCR $210_0$–$210_{63}$. The respective notification control register can be used for control, e.g., of if, when, and how a CCR $210_0$–$210_{63}$ attempts to notify a CPU $102_0$–$102_6$. The fields in the respective NCRs may include a read/write notify enable field, notify_en, e.g., in bit 0, which, when asserted, will cause CPU notification to be attempted when the credit count field, credit_count, in the respective CCR $210_0$–$210_{63}$ is a non-negative number. Notification in the embodiment disclosed can be configured to always include setting a bit in a notification poll register. Interrupts and arbitration are also options.

The configuration and contents of the respective NCRs can also include a read/write arbitration enable field, arb_en, e.g., at bit 2, which, when set, will cause the respective CCR $210_0$–$210_{63}$ to notify the CPU $102_0$–$102_6$ by participating in notification arbitration. This field is ignored if the notify enable field, notify_en is=0. The respective NCRs may also include a read/write interrupt enable field, int_en, e.g., at bit 1, which, when asserted, can cause the respective CCR $210_0$–$210_{63}$ to notify the CPU $102_0$–$102_6$ by generating an interrupt. The respective CCR $210_0$–$210_{63}$ may also include a read/write arbitration group field, arb_gp, e.g., at bits 4:3, which specifies the arbitration group to which the respective CCR $210_0$–$210_{63}$ belongs.

This arbitration group field is ignored if the notify enable field, notify_en, is=0 or the arbitration enable field, arb_en, is=0.

A CCR $210_0$–$210_{63}$ will attempt notification any time it is enabled and the value in the CCR $210_0$–$210_{63}$ is non-negative. As an example: if a producer wants to send a message that requires 5 credits the producer would, e.g., generate a write subtract to the respective CCR $210_0$–$210_{63}$ in order to subtract 5 from the CCR $210_0$–$210_{63}$ by doing such a write to the respective CCR $210_0$–$210_{31}$ and then perform a local read to the respective local CCR $210_0$–$210_{63}$ to see if the respective local CCR $210_0$–$210_{63}$ was still non-negative.

If the CCR $210_0$–$210_{63}$ contains a negative number, it would then enable notification and go on to perform some other function. When the $5^{th}$ credit is placed in the CCR $210_0$–$210_{63}$, the value would be equal to 0 and the CCR $210_0$–$210_{63}$ would again attempt notification. When the producer is notified it must remember that it has already subtracted the 5 credits and it is now safe to send the message.

NCR commands. Each NCR may also be aliased to four different addresses in either the PLB 20 address space and or the local processor bus/memory interface 110 register space. The four separate functionalities may be, e.g., for a read a read contents and for a write a write contents, or for a read a read contents and for a write a write to the notify enable field notify_en in the notification control register, or two other functionalities currently reserved, as is determined by the contents of the command field cmd in the NCR access address, e.g., a PLB NCR access address. The command field, cmd, may be e.g., bits 5:4 of the NCR access address.

Similarly, a local processor bus/memory interface 110 NCR address, distinguished from a PLB NCR access address as noted above with respect to PLB CCR and local CCR access addresses, including bit 6 set to 1, may contain similar fields.

Queue Vector Pointer Register ("QVPR"). The contents of a queue vector pointer register ("QVPR") 290, shown in FIG. 3 may be configured to be determined by both firmware and hardware. The firmware may initialize a queue vector base field, qvec_base, and the hardware may generate a queue vector offset field, qvec_offset. The queue vector offset field, qvec_offset, may be based on the most recent winner of notification arbitration. If there is currently no CCR $210_0$–$210_{63}$ requesting notification arbitration, the queue vector offset field, qvec_offset, may be derived from the contents of the NOP vector offset register. The firmware may initialize an array of pointers somewhere in memory that point to data structures contained in an array 294 used to process each of the CCRs $210_0$–$210_{63}$. The firmware may also initialize the queue vector base field, qvec_base, to point to that array 294. Once initialized, the QVPR 290 should always contain the address of the pointer for the respective CCR $210_0$–$210_{63}$ that is the most recent winner of notification arbitration.

When the firmware is looking for the next thing to do it will read the QVPR 290 to get the address of the next pointer to process, i.e., the one that was the most recent winner of the arbitration process. The queue vector offset field, qvec_offset, is a read only field in the respective QVCR 290 that is, e.g., in bits 8:2, which specifies the offset into the array of pointers 294 located at the memory location specified in the queue vector base field qvec_base. The value of the queue vector offset qvec_offset is always the same as the curr_ccr field of an arbitration results register. The curr_ccr field also specifies the CCR $210_0$–$210_{63}$ that is the most recent winner of notification arbitration process. The queue vector base field, qvec_base, is a read/write field that contains the base memory address of the array of pointers 294 used to process the respective CCR $210_0$–$210_{63}$ that won notification arbitration.

Reading the queue vector pointer register has the side effect of locking in the current CCR field, curr_ccr, in the arbitration results register. The value in the current CCR field, curr_ccr, in the arbitration results register will not change until the QVPR 290 is read again. The current CCR field, curr_ccr, can be used to determine the value of the next header pointer register 296 and indirect accesses to the CCRs and NCRs. The current value field, curr_ccr, in the arbitration results register can also be used when writing to the update head pointer register. The current CCR field, curr_ccr, in the arbitration results register can also be modified by writing to the arbitration results register.

Head Pointer Register (HPR). Each message queue $202_0$–$202_{31}$ maintains a head pointer. The head pointer is never used directly by the hardware, except for message queue $202_0$–$202_{31}$ overflow detection. The head pointer is provided to assist the firmware in loading the next message from a particular message queue $202_0$–$202_{31}$. There is a head pointer register ("HPR") included for each of the message queues $202_0$–$202_{31}$. The HPRs will normally be accessed indirectly via the next head pointer register 296 and the update head pointer register. The HPRs can be read and written directly but that may only be allowed for initialization and diagnostic purposes. Direct access to the HPRs while there is other head pointer activity can cause corruption of the head pointers. Each respective head pointer register may contain a head pointer field, head_ptr, e.g., at bits 14:2, which is a read/write field that specifies the address in local data RAM, i.e., the DPDR 104, where the first word of the next message in a respective message queue $202_0$–$202_{31}$ is stored. Each respective head pointer register must be initialized by the firmware to point to the base location of the respective message queue $202_0$–$202_{31}$ prior to receiving the first message.

This initialization value may be obtained from the queue vector base field, qvec_base, and queue vector offset field, qvec_offset, values in the respective queue vector pointer register 290. Each head pointer register also has a wrap field, W, e.g., at bit 15, which is maintained by hardware and used to distinguish a message queue $202_0$–$202_{31}$ that is full from a message queue $202_0$–$202_{31}$ that is empty when the head pointer equals the tail pointer. The bit must be initialized to 0 by firmware before using the respective message queue $202_0$–$202_3$ and not be modified while the respective message queue $202_0$–$202_{31}$ is in operation.

Next Head Pointer Register (NHPR). The respective NHPRs can be utilized to always reflect the value of the HPR associated with the most recent winner of notification arbitration. If the most recent winner was a CCR $210_0$–$210_{63}$ greater than CCR $210_{31}$, the contents of the NHPR will be undefined, when no further message queues exists in addition to message queues $202_0$–$202_{31}$. The most recent winner of notification arbitration is established when the QVPR 290 is read. The head pointer base field, head_ptr_base in the next head pointer registers NHPRs is initialized by firmware to point to the base address of the respective one of the message queues $202_0$–$202_{31}$. This would normally be the internal DPDR 104 address but could be mapped to the PIF 110 or PLB 20 DPDR 104 address. Writes to the NHPRs are done only to initialize the head pointer base field, head_ptr_base.

Update Head Pointer Register (UHPR). An update head pointer register ("UHPR") can be provided to assist the firmware in updating the head pointer registers. Writes to each respective UHPR will result in the value written being added to the contents of the respective head pointer register pointed to by the most recent winner of notification arbitration process. The hardware can be configured to deal with wrap-around on the head pointer based on the specified queue size and message size. The msg_size field of the respective QCR, will specify the maximum size message that the hardware can guarantee not to wrap. If the firmware reads a message of length less than or equal to value of the message size field, msg_size, the firmware does not have to check for the wrap case. If the current winner of notification arbitration is a CCR $210_0$–$210_{63}$ number greater than $CCR_{31}$, writes to this register will have no effect.

The head pointer increment field, head_ptr_inc, a write only field, e.g., at bits 7:0 of the update head pointer register may be used to contain a value that can be added to the value stored in the head pointer register associated with the respective CCR $210_0$–$210_{63}$ that most recently won notification arbitration. The hardware will deal with roll-over of the head pointer. If the CCR $210_0$–$210_{63}$ that most recently won notification arbitration is not associated with a message queue $202_0$–$202_{31}$ then writing this register has no effect.

QVPR Stall Enable Register. Each QVPR 290 may contain a stall enable bit, which, when asserted will cause the QVPR 290 to stall the respective CPU $102_0$–$102_6$ on reads when no CCR $210_0$–$210_{63}$ is attempting notification arbitration. The stall will be caused essentially by the respective QVCR 290 not returning a data ready to the respective CPU $102_0$–$102_6$ when there is no CCR $210_0$–$210_{63}$ attempting notification arbitration. This stall may be broken if an interrupt is issued to the respective CPU $102_0$–$102_6$. This feature is useful in conserving power and preventing unnecessary bus communication for a processor that is not fully utilized looking for something else to do. The QVPR 290 stall enable registers may include a stall enable field, stall_en, which is a read/write field, e.g., contained at bit 0, which when set will cause reads to the respective QVPR to stall the respective CPU $102_0$–$102_6$ if there are no CCRs $210_0$–$210_{63}$ requesting notification arbitration. The QVPR stall enable registers may also contain an arbitration mode read/write field, e.g., at bit 1 that when set will cause a re-arbitration to take place for every CCR request change that occurs. This mode will increase the average latency of reading the QVPR but should produce more effective arbitration results.

NOP Vector Offset Pointer Register. The NOP vector offset pointer register can be initialized by the firmware, e.g., following reset. The NOP vector offset pointer register may include a read/write NOP offset field, nop_offset, e.g., in bits 6:0 that can be copied from bits 8:2 of the respective QVPR if there is no CCR $210_0$–$210_{63}$ requesting notification arbitration.

Normally this field will be set to the maximum number of CCRs $210_0$–$210_{63}$ participating in notification arbitration +1. The purpose of the NOP vector is to indicate to the firmware that there are no CCRs $210_0$–$210_{63}$ requesting arbitration notification.

Notification Poll Register. A notification poll register can be a read-only register that contains a bit for every CCR $210_0$–$210_{63}$. Each such bit, e.g., notify_poll[0] maps to a respective one of the CCRs, i.e., $CCR_0$, notify poll[1] maps to $CCR_1$, etc. Each such bit can be asserted if the corresponding CCR $210_0$–$210_{63}$ is attempting notification. Notification will be attempted anytime (notify_en=1) and (CCR>=0). The Notification poll register must be accessed as two separate 32-bit registers, unless a TIE instruction is utilized. Writes to the notification poll registers have no effect. The main intent of the notification poll register is to provide the firmware with all the information it needs to determine which CCR $210_0$–$210_{63}$ to service next in case it doesn't want to use the hardware arbitration or interrupt method.

Notification Interrupt Register (NIR). A notification interrupt register can be used to identify any CCR $210_0$–$210_{63}$ that is attempting notification via interrupts. It is also a 64-bit register with each bit used to indicate if the associated CCR $210_0$–$210_{63}$ is issuing an interrupt. All CCR $210_0$–$210_{63}$ interrupts can map to the same interrupt signal to the Xtensa core 102. An interrupt can be cleared by either disabling the interrupt or by taking steps necessary to make the CCR $210_0$–$210_{63}$ value negative.

Notification Arbitration. Notification arbitration is the primary means of a CCR $210_0$–$210_{63}$ notifying a respective CPU $102_0$–$102_6$ of a message/task being ready for processing. Each CCR $210_0$–$210_{63}$ participating in notification arbitration will be assigned to one of four arbitration groups, e.g., in the notification (arbitration) control register ("NCR").

Arbitration Group Control Register. Each arbitration group can be assigned a class and a priority, e.g., in the arbitration group control register. Each of the groups, e.g., 3-0 may be defined in the arbitration group control register, e.g., utilizing four groups of 8 bits, respectively 7:0, 15:8, 23:16 and 31:24, with the 6 LSBs in each such group containing the priority count and the upper two MSBs identifying the class of the group.

These two fields determine the order in which hardware service requests will occur when there are multiple notification requests active. The notification configuration register can be used to specify which arbitration group the respective CCR $210_0$–$210_{63}$ is using. The four groups in the arbitration group control register may each include a priority field, priority, e.g., in bits 5:0, 13:8, 21:16 and 29:24 that is a read/write field that can be used to specify the priority count of group N. This field can be implemented as a count of the number of times a CCR $210_0$–$210_{63}$ in another group in the same class will be the winner of arbitration relative to this group. The higher the priority count, the lower the priority. Each of the other two MSBs in the four groups in the arbitration group control register may be used to identify a respective one of four classes to be associated the respective group 3-0. Arbitration groups will not win notification arbitration if there is an active request from a group with a higher class. The higher the class number, the higher the priority.

CCRs $210_0$–$210_{63}$ of similar functionality can be in the same group. For example, all messages queues $202_0$–$202_{31}$ that are used for "new work" can be put it the same arbitration group. If the respective CPU $102_0$–$102_6$ gets to a point where it is unable to service new work, due, e.g., to its memory being full, it would disable arbitration for that group of message queues $202_0$–$202_{31}$. This would have no effect on the other arbitration groups. Each arbitration group is assigned a priority count and class relative to the other arbitration groups. For example, if arbitration groups 0 and 1 are both arbitrating at class 3 and group 0 has a priority count of 1 and group 1 has a priority count of 10, group 1 will win arbitration approximately every $10^{th}$ time over arbitration group 0, again, assuming there are always requests active in both groups.

Arbitration Group Enable Register

An arbitration group enable register may be used to control whether the associated arbitration group 0-N, e.g., 0-3 is enabled to participate in notification arbitration. The arbitration group enable registers may all be implemented as read/write registers having the LSB form an enabled field, E, which when asserted for the group 0-N associated with the particular arbitration group enable register is participating in notification arbitration. The arbitration group enable registers can be accessed directly via the PIF 110.

Arbitration Results Register. The current CCR field, curr_ccr, of the arbitration results register can be updated by hardware when the respective QVPR is read to contain the winner of notification arbitration. If there are no CCRs requesting arbitration when the QVPR is read, the current CCR field, curr_ccr, reflects the contents of the respective NOP vector pointer register. The current CCR field, curr_ccr, can be modified directly by firmware in order to control any of the CPU modules $100_0$–$100_6$ indirect registers that are based on the most recent winner of notification arbitration. The current CCR field, curr_ccr, can be a read/write field that can be updated by hardware with the most recent winner of notification arbitration when the QVPR is read. It can be written by firmware to control access to indirect registers. The re-arbitrate bit provides a means for the firmware to initiate a new arbitration. Writing the re-arbitration bit, which is write only, does not update the arbitration priorities. The re-arbitration bit should not be necessary for normal operation. This bit can be written to force the arbitration circuit to re-arbitrate. Normally re-arbitration will only take place following a read of the QVPR. Forcing a re-arbitration does not change the round-robin arbitration priorities.

Local DMA Controller. Each CPU module $100_0$–$100_6$ can also contain a local DMA (LDMA) controller 310. The primary purpose of the local DMA controller 310 is to offload from the respective CPU $102_0$–$102_6$ the tasks of data movement, e.g., from directly moving data into or out of its local data RAMs, e.g., the DPDR 104. To perform this function effectively, the LDMA controller 310 requires very low overhead for the respective CPU $102_0$–$102_6$ to queue a DMA operation. As a part of this, the LDMA controller 310 advantageously can be able to queue a message following the completion of a DMA operation; transfer data between, e.g., the local DPDR 104 and any other PLB 20 addresses; transfer data between two local locations, e.g., different locations in the DPDR 104, transfer data from any PLB 20 address directly into a local message queue; and transfers data between two PLB 20 locations. Also, advantageously the LDMA controller 310 should be able to do a single word store to any PLB 20 address. Also, advantageously a Fibre Channel CRC should be able to be calculated on any data that is moved with the LDMA 310 engine. Also the LDMA engine should be capable of searching an array of data to find, e.g., a specific match, e.g., a 32-bit match.

The firmware should essentially never have to wait for data that has been fetched, e.g., from DDR. It would instead queue a DMA request with a message to a local message queue to be issued upon completion of the transaction by the LDMA controller 310. This is effective when the overhead for queuing the DMA and scheduling a new task is lower than the delay incurred by waiting for the data to be returned from memory, e.g., a double data rate ("DDR") synchronous DRAM ("SDRAM") or the like.

Figure 5:
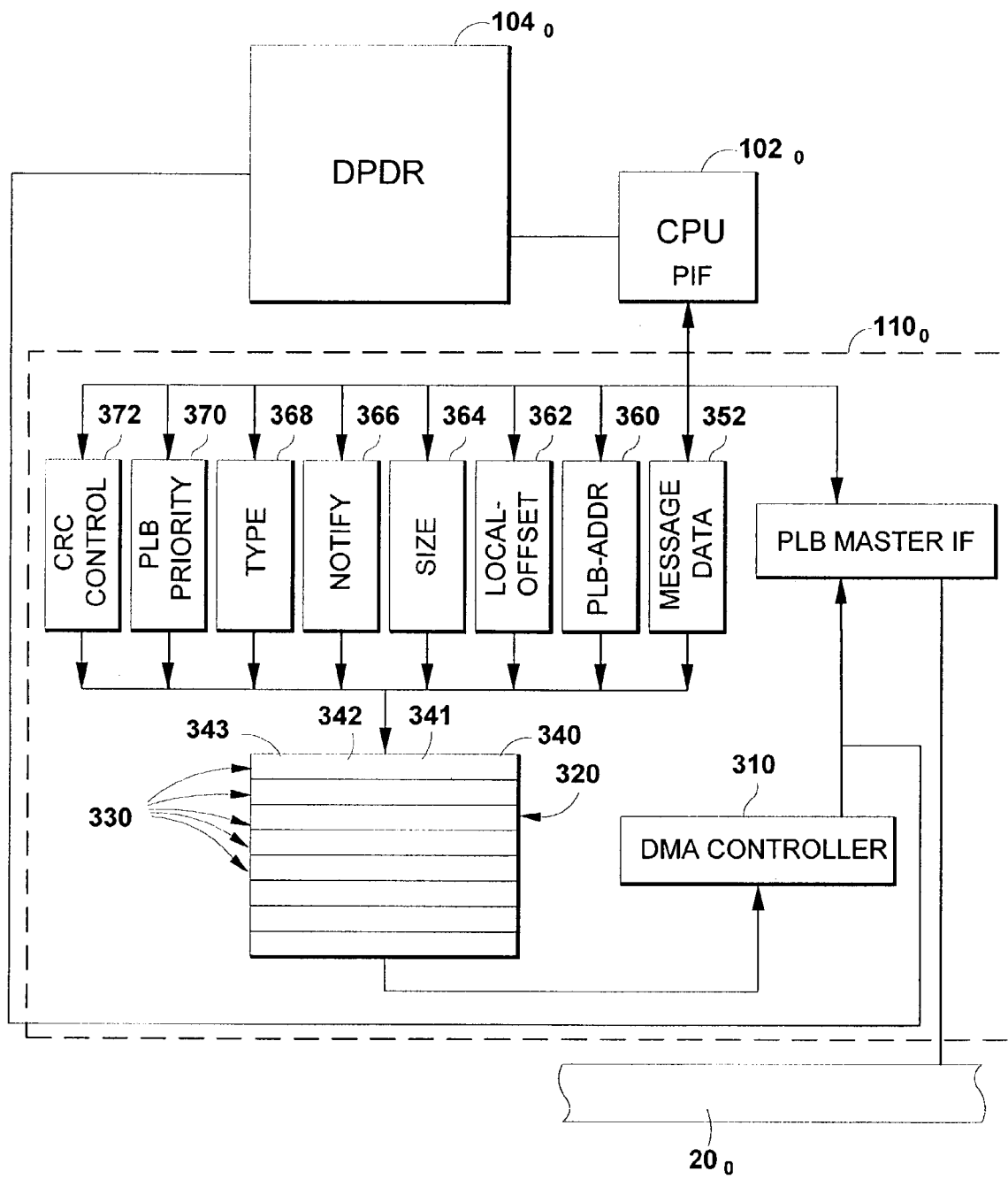
FIG. 5 shows a more detailed view of portions of the CPU/Bus memory interface according to embodiments of the present invention.

Referring now to FIGS. 3 and 5, LDMA controller 310 can have a queue ("DMAQ") 320 that, e.g., can hold up to 8 descriptors, e.g., in an eight position FIFO having room for a descriptor in each position 330 of the FIFO of the DMAQ 320. Once in the DMAQ 320, the LDMA 310 operations can be completed in order, e.g., by processing each descriptor in each position 330 of the FIFO of the DMAQ 320 in order. The LDMA controller 310 may be configured to support different options for flow-control on the DMAQ 320. The LDMA controller 310 can have the ability to increment any given CCR $210_0$–$210_{63}$ once a descriptor is removed from the DMAQ 320. The firmware can use this particular CCR $210_0$–$210_{63}$ to flow control the DMAQ 320 in a similar fashion to any other message queue, e.g., $202_0$–$202_{31}$. There can also be a stall mode supported that could cause any write to a full DMAQ 320 to simply stall the local processor CPU $102_0$–$102_6$. This can be made invisible to the firmware. The stall option may be useful when there is little else that could be accomplished if the DMAQ 320 is full.

The LDMA controller 310 also can be made to support a mode called immediate DMA (iDMA). If the respective CPU $102_0$–$102_6$ needs to move some data but also needs to wait for it to finish before moving on to the next task, it can initiate an iDMA that bypasses any descriptors that may be in the DMAQ 320. An iDMA status register can be included in the CPU bus/memory interface 110 register space that can be read by the respective CPU $102_0$–$102_6$. The status may be set up to not be returned until the DMA transaction is complete. From the perspective of the firmware, the firmware simply initiates the DMA transaction and then reads the status. At the point the status is returned, the firmware knows the DMA transaction has been completed. There are no completion messages associated with an iDMA transaction. LDMA Descriptor. The LDMA controller 310 DMAQ 320 may be formed by an 8-entry FIFO that feeds the LDMA controller 310. Each entry of the DMAQ 320 may be, e.g., a 119-bit value that represents a descriptor and a completion message. The DMAQ 320 may be written via eight 32-bit staging registers, 360, 362, 364, 366, 368, 370, 372 and 352, which may be contained in the PIF register space in the Message Hardware/Local DMA unit 110. Each field of the descriptor may, e.g., appear as the least significant bits of its own 32-bit register. The descriptor will be written to the DMAQ 320 when the PLB 20 address register 360 is written. The DMAQ 320 staging registers 352, 360, 362, 364, 366, 368, 370 and 372 may retain their value so they do not need to be rewritten between descriptors if the values in these registers have not changed. For example, if all local DMA 310 transactions use the same type of notification the LDMA notify register 366 would never need to be written after it is initialized. The DMA controller 310 descriptor staging registers 352, 360, 362, 364, 366, 368, 370 and 372 may be configured to be write-only registers. The contents of the DMAQ 320 itself can be read for diagnostic purposes.

The DMAQ 320 may be targeted to any of the CCRs $210_0$–$210_{63}$ for flow-control purposes. The firmware may be configured to avoid overflowing the DMAQ 320 by checking the designated CCR $210_0$–$210_{63}$ to see if there is available space. The firmware can initialize the designated CCR $210_0$–$210_{63}$ to the depth of the DMAQ 320, i.e., 8. Alternatively, flow-control can be accomplished via the DMAQ 320 stall function. When enabled, writes to the DMA PLB 20 address register 360 will stall the CPU $102_0$ if the DMAQ 320 is full. The write will only complete when room becomes available in the DMAQ 320 and also possibly during certain error conditions. Several of the LDMA 310 descriptor fields show up in more than one register 352, 360, 362, 364, 366, 368, 370 and 372. In this case, whichever register 352, 360, 362, 364, 366, 368, 370 and 372 is written last, but prior to writing the LDMA PLB address register, is the one that can be selected to be used to complete the descriptor.

LDMA Type Register. One part of the LDMA descriptor can be included in an LDMA type register 368. The LDMA type register can be a write only register with the three LSBs of the register defining the type of operation the DMA controller 310 will perform. In some cases the exact definition of the other DMA 310 fields is also a function of the value of the type field. The meaning of the possible values for the type field of the LDMA type register 368 can be, e.g., copy data from the PLB address to a local data RAM address; copy data from a local data RAM address to the PLB address; copy from one location in local data RAM to another location in local data RAM; copy data from the PLB address to a local message queue (exactly one message must be contained in the DMA operation), calculate the cyclic redundancy check ("CRC") from data at the PLB address (data is not stored and the local offset register must be set to 0); calculate the CRC from data at the local data RAM address (data is not stored and the PLB Address must be set to 0); store the contents of a DMA message register to the PLB 20 address specified in an LDMA PLB Address register 360 (this DMA type may be highly constrained since the message type can be set, e.g., at 0, the size can be set, e.g., at 4, the visible bit can be specified, e.g., at be 1, and the crc_en bit can also be specified, e.g., at 0); or copy data from one PLB 20 address to another PLB 20 address, depending upon which bits of the type register 368 field are set. The type register 368 only needs to be written when the value actually changes. Otherwise the current contents of the type register will be used when creating the DMA 310 descriptor.

LDMA Notify Register. An LDMA 310 descriptor may also contain notify fields, which can specify the target device (if any) to notify upon completion of the DMA 310 transaction. It may also be used to indicate whether to send a completion message and whether to force the message to be visible on the PLB 20. The notify fields may be contained in an LDMA notify register 366, which may include a write only message queue number field, mq_num, e.g., at bits 5:0, that can be utilized to specify the target message queue $202_0$–$202_{31}$ or other CCR $210_{32}$–$210_{63}$ for the completion message. The notify register may also include a unit number field, unit_num, e.g., at bits 9:6, which may be utilized to specify the target CPU $102_0$–$102_6$ unit, and which is not used when V=0. The notify register 366 may also include a bus field, bus, e.g., at bits 11:1, that can be utilized to specify the target bus, and is not used if V=0. The notify register 366 may also include a visibility field, V, e.g., at bit 12, which selects if the transaction on the LDMA 310 is to be visible, i.e., when asserted the message will be sent via the PLB 20 even if the target is within the local CPU module $100_0$–$100_6$. When cleared it is assumed that the target message queue $202_0$–$202_{31}$ or other CCR $210_{32}$–$210_{63}$ is local and no transaction will be issued on the PLB 20. The notify register 366 may also include a message type field, mtype, e.g., at bits 15:12, which can be utilized to specify the type of completion message to be utilized, from among a set of completion messages described in more detail below. The notify register 366 only needs to be written when the value actually changes. Otherwise the current contents will be used when creating the next DMA 310 descriptor. The notify register 366 may be ignored when doing an iDMA. Also, the hardware may, e.g., force the mtype to 0 when an iDMA operation command is issued.

LDMA Size Register. Also associated with an LDMA 310 transaction may be an LDMA size register 364, which may, e.g., contain in its 12 LSBs a size field, size, that is an indication of the length of the DMA transfer of, e.g., the data/message to be transferred, e.g., the number of bytes to be transferred. The maximum value for transactions involving the PLB 20 is currently limited to be 4080−plb_addr[3:0]). The maximum legal value of the size field, therefore, is (4080−plb_addr[3:0]) when either the source or the destination of the DMA 310 operation is the PLB bus 20. The size field in the LDMA size register 364 can also be programmed from an LDMA control register, described below.

LDMA Control Register. An LDMA control register (not shown) may also be provided as a short-cut to programming the size 364, type 368, and notify 366 registers with a single write. These size, type and notify fields will frequently be a constant for many firmware functions.

These size, type and notify fields reference the exact same physical registers as the type 368, notify 366, and size 364 registers. The LDMA control register, therefore is a register containing all of the same fields just described for the type register 364, message register 352, PLB address register 360, notify register 366, and size register 368, with the same fields, mq_num, e.g., at bits 5:0, unit_num, e.g., at bits 9:6, bus, e.g., at bits 11:10, V, at bit 13, mtype at bits 15:13, size, e.g., at bits 27:16, and type, e.g., at bits 30:28, with the last bit 31 used as a CRC enable field.

LDMA Local Offset Register. An LDMA local offset register 362 can be provided, primarily to be used to store an index into the DPDR 104. For PLB 20-to-PLB 20 DMA transactions, the DPDR 104 is not used and this local offset register 362 may be ignored. The local offset register 362 may not be big enough to store a whole PLB 20 address. In this case, the local offset register may be used to hold only, e.g., response message data. The response message data can be limited to 16-bits in this case. Some parts of the response message may be used to hold control information, e.g., if CRC or compare operations are enabled. The LDMA local offset register 362 is a write only register that contains a compare enable field, comp_en, e.g., at bits 7:4, which can be defined when doing compare operations on PLB 20-to-PLB 20 DMA (crc_en=1;crc_type=1;dma_type=7). Each bit of the comp_en field can be used to enable the comparison operation for the corresponding byte of a CRC seed register, discussed below. The local offset register 362 may also have a CRC delay field, crc_delay, e.g., at bits 3:0, which can be utilized to define a delay when doing a CRC operation with delay on a PLB 20-to-PLB 20 DMA operation (crc_en=1; crc_delay=1;dma_type=7). This CRC delay field can specify, e.g., the number of 64-bit words of DMA data to skip before starting the CRC calculation. The local offset register 362 alternatively may be used to specify a local offset field, local_offset, also in bits 15:0, which can be utilized to perform local DMA transactions. The local_offset field normally contains the byte offset into the DPDR 104 for most transactions. For local-to-local transfers this offset represents the source of the data. For transactions to local message queues $202$–$202_{31}$ the local_offset field can be treated to contain the 5-bit value that specifies the target message queue $202$–$202_{31}$. For PLB 20-to-PLB 20 DMA, this field may be used for the completion message. These fields may be updated in the local offset register 362 at the start of each DMA transaction depending upon whether it is a local or a PLB 20 transaction.

LDMA PLB Address Register. There may also be provided an LDMA PLB address register 360. Writing to the LDMA PLB address register may be configured to be what initiates an LDMA operation, and a DMAQ 320 load. The PLB address register 360 may contain in its bits, e.g., bits 31:0 a PLB 20 address field, plb_addr. The plb_addr field normally contains the 32-bit address of the initial PLB 20 address for the DMA transfer. For local-to-local transfers the plb_addr field can contain the 15-bit offset into the local data RAM, e.g., the DPLR 104 for the destination location. For PLB 20-to-PLB 20 transfers the plb_addr field can contain only the destination PLB 20 address. Access to the plb_addr field may be write only.

The LDMA PLB address register 360 may be aliased into two locations in the address map. Writing the register 360 through the first address may be configured to cause the descriptor to be copied from the LDMA registers, i.e., the LDMA PLB priority register 370, the LDMA CRC Control register 372, the LDMA type register 368, LDMA message register 352, LDMA PLB address register 360, LDMA notify register 366, and the LDMA size register 364, or simply from the LDMA control register (not shown), into the DMAQ position 330 made up of a plurality of registers as discussed below. Writing it through the other address can be configured to cause the descriptor to be used for iDMA and the DMAQ 320 registers 330 may then be bypassed. Initiating an iDMA transaction ordinarily must be followed by a read of the immediate DMA status register discussed below.

LDMA Message Register. An LDMA message register 352 may be provided to contain a 32-bit completion message that is optionally sent upon completion of the DMA operation in a DMA response field, dma_resp_data, e.g., in bits 31:0. This message contained in the dma_resp-data field can be sent to any message queue $202_0$–$202_{31}$ in the chip, i.e., associated with any CPU unit $CPU_0$–$CPU_6$. For PLB 20-to-PLB 20 DMA operations this LDMA message register may be used for the source PLB 20 address and the LDMA local offset register 362 may be used for the completion message. This configuration can save storage space in the LDMA controller 310 that would have been required to support PLB 20-to-PLB 20 DMA transactions. This LDMA message register 352 may also optionally be used for some control information when doing CRC or compare operations, by accessing the field containing comp_en, e.g., in bits 7:4 and crc_delay, e.g., in bits 0:3 and also, where there is a DMA response message is to be used, the dma_resp field, contained, e.g., in bits 31:8. The dma_resp field contains the actual completion message data when doing a DMA operation that includes a non-zero response. The exception is when doing PLB 20-to-PLB 20 DMA this dma_resp field is used for the source PLB 20 address. Dual purposing this message register 352 also reduces the number of registers needed. The comp_en field can be used to define when doing compare operations (crc_en=1;crc_type=1). Each bit of the comp_en field can be used to enable the comparison operation for the corresponding byte of the CRC seed register. The crc_delay field can be used to define, when doing a CRC operation with delay (crc_en=1;crc_delay=1), the number of 64-bit words of DMA data to skip before starting the CRC calculation. Access to these fields is all write only. Messages to the respective local CPU $102_0$–$102_6$ can also be forced to write their messages to the PLB 20 (visible mode), e.g., for diagnostic purposes.

LDMA PLB Priority Register. An LDMA PLB priority register 370 may be utilized to program the priority used when mastering a PLB 20 transaction. The contents of this PLB priority register may be loaded into the LDMA controller 310 on the DMAQ, e.g., when the PLB address register is written, along with the rest of the DMA descriptor. The PLB priority register may have a priority field, pri, e.g., in its two LSBs that may be utilized to indicate the priority level to be used when the DMA transaction is initiated on the PLB 20. Access to this field is write only.

LDMA CRC Control Register. The Local DMA controller 310 engine can be configured to have the ability to calculate a CRC while moving data. A seed can be used to calculate the CRC and can come from one of 4 different seed registers (not shown). A CRC may, e.g., be chained between two or more different DMA operations, e.g., by using a single seed register. This can allow up to 4 different CRC chains to be active simultaneously. The CRC result can be read directly from the respective CRC seed register or it can be returned as part of the completion message. The CRC will work correctly only if the destination address is 4-byte aligned and the length of the data is a multiple of 4-bytes. The contents of a CRC control register 372 may be copied into the DMAQ 320 along with the rest of the descriptor, e.g., when the PLB address register is written. The CRC control register 372 may contain a CRC enable field, crc_en, e.g., in bit 0, which can be utilized to generate a CRC during the DMA process. The CRC control register may also include a CRC type field, crc_type, e.g., at bit 4, which may be used to specify whether the hardware is to do a Fibre Channel CRC operation or to do a compare function between the respective CRC seed register and the DMA data. For the compare operation the data returned may be used as an index that points to the location of the first match as well as a match and multiple-match indication. Chaining the compare functions may not be effective given that the contents of the respective seed register is changed to the index by the DMA operation. The compare results can be returned in the completion message in the exact same fashion as the normal CRC results. Bits 7:4 of the response message may be utilized as a byte compare enable field when using the compare function. For example if dma_resp_msg[7:4]==4'b1000, then only the most significant byte of the DMA data word would be compared to the contents of the target seed register. The CRC control register 372 may also include a CRC selection field, crc_sel, e.g., in bits 2:0, which can be utilized to specify which of the four CRC seed registers will be used for the CRC calculation. The CRC control register 372 may also include a CRC chain field, crc_chain, e.g., at bit 3, which may be utilized when asserted to cause the CRC calculation to use the contents of the respective seed register as the CRC seed. When cleared, the respective CRC seed register will be initialized to 0xffffffff before starting the calculation. The CRC type field also can be utilized to cause a Fibre Channel CRC to be calculated. When asserted, the DMA data will be compared to the contents of the specified seed register. Bits[7:4] of the response message field of the DMA descriptor are used as byte compare enables. The CRC results will contain the index of the first match that was encountered as well as match and multiple-match indications. The CRC control register 372 may also contain a CRC delay field, crc_delay, e.g., in bit 5, which may be utilized when asserted to cause the first N double words (8 bytes) of the DMA data to be skipped before starting the CRC calculation. N is specified in the lower 4-bits of the response message field for the DMA descriptor. N has a maximum value of 15 that will allow up to 15, 64-bit words to be skipped before starting the CRC calculation. If the target address of the DMA operation starts on a 32-bit aligned address, the first skip will actually only skip 1 word of data, reducing the maximum amount of data that can be skipped to 29 32-bit words. Access to these fields may be write only.

In operation the stall mode may be accomplished by the CPU writing to the LDMA PLB address register 360 into the plb_addr field as a last step in creating a designator for loading into the DMAQ 320 into a position 330 in the FIFO of the DMAQ 320. At this point if the DMAQ 320 is indicated to be full and the stall mode is enabled, the CPU $100_0$ will stall until the ongoing LDMA transaction is completed processing after which a position 330 in the FIFO of the DMAQ 320 will open, e.g., by the next in order position 330 in the FIFO of the DMAQ 320 being loaded into the LDMA controller 310. The content of the staging registers 360, 362, 364, 366, 368, 370 and 372 may then be loaded into the DMAQ 320 and the CPU $100_0$ taken out of the stall condition.

In operation, the respective fields of the staging registers 360, 362, 364, 366, 368, 370 and 372 may be hard wired into the respective bit positions of the DMAQ 320 FIFO position DMAQ entry registers $N_0$ 340, $N_1$ 341, $N_2$ 342 and $N_3$ 343.

CRC Seed Registers. The local DMA controller 310 engine may have four 32-bit seed registers used as the accumulators when calculating the CRC during a local DMA transfer. These seed registers may be utilized to hold the compare value when using the compare function. The seed registers can be directly accessed via the bus memory interface 110 register space. The seed register may have a CRC field, crc, e.g., in bits 31:0, which may be accessed by, read or write and which may be utilized to contain, when doing a CRC operation (crc_en=1;crc_type=0), the CRC value. If the CRC operation is not chained, the respective seed register may be initialized to 32'hffffffff by the hardware. The seed registers may contain the final CRC value following the DMA operation. The seed register may also contain a computed value field, comp_value, also, e.g., in bits 31:0, which may be used to contain, prior to doing a compare operation (crc_en=1;crc_type=1) a value initialized by the firmware to the compare value. The actual bytes compared can be controlled by the byte compare enable bits, which are bits [7:4] of the DMA response message. The seed register may also include a match field, match, e.g., at bit 12, that may serve to indicate, following the compare operation being completed, if at least one successful match occurred. The seed register may also contain a multiple match field, multiple_match, e.g., at bit 13, which may be utilized, e.g., to indicate, after the compare function has been performed, if 2 or more successful matches occurred. The seed register may also contain an index field, index, e.g., in bits 11:0, which may be utilized, after a compare has been completed, and if the match bit is asserted, to indicate the word index into the DMA data where the first successful match occurred. Access to these fields are by read or write.

LDMA Enable Register. An LDMA enable register may be used to enable/disable additional local DMA operations. DMA operations that are in progress will complete normally. This LDMA enable register may also contain a reset bit that will empty the LDMA controller 310. The LDMA enable register may include a DMA enable field, e.g., dma_enable, e.g., contained at bit 0, which when asserted may be utilized to enable the DMA process, such that DMA transactions will be processed normally. When cleared, any DMAs in progress will be completed but no additional ones will be issued. The LDMA enable register may include a DMA active field, dma_active, e.g., in bit 1, which when asserted, along with dma_enable=1 to allow DMA transactions to occur. The bit in this field is asserted when a DMA operation is in progress. If dma_enable=0 and dma_active=0 then there will not be any more DMA transactions until dma_enable is again asserted. Access to the dma_enable field is both read and write and access to the dma_active field is only write. The DMA enable register may also have a DMA queue reset field, dmaq_reset, that is accessible by write only, e.g., in bit 2, that when asserted can be utilized to remove all descriptors in the DMAQ 320. This will not affect any DMA transactions already in progress. The DMA enable register may also have a stall enable field, stall_enable, e.g., at bit 31, which may be both read and write accessible and when asserted may be utilized to cause the bus memory interface 110 to stall the respective CPU $102_0$–$102_6$ when an attempt is made to queue a DMA transaction when the LDMA 310 is full. Writes to the DMAQ 320 may be discarded if the FIFO of the DMAQ 320 is full and an error has been detected. If the stall_enable bit is not asserted, the descriptors may be discarded even if an error has not been detected. This may be necessary to avoid a deadlock situation where the processor is attempting to fetch an instruction but it is blocked by DMA descriptors that can not fit in the LDMA 310.

Immediate DMA Status Register. An immediate DMA, iDMA, status register may be contained in the respective CPUs $102_0$–$102_6$ bus memory interface 110 register space. The iDMA status register may include a complete field, complete, which may be read accessible only, e.g., in bit 0, which when set, can indicate that the DMA operation has completed. The iDMA status register may include a data error field, data_err, that may be accessible only by a read, e.g., contained at bit 1, which when asserted may indicate that the DMA operation did not complete successfully due to a data error on the PLB 20.

The primary function of the iDMA status register is to stall the respective CPU $102_0$–$102_6$ until an immediate DMA operation has been completed. When read, it will delay the return of the status to the respective CPU $102_0$–$102_6$ until there isn't an iDMA operation pending. The iDMA, status register returns the status of the last iDMA operation to complete. If the register is read when DMA is not enabled the read will return immediately and the complete field bit will not be asserted. The iDMA status register may include an overflow error field, ovfl_err, which may be accessible by read only and which may be contained, e.g., at bit 2, and, when asserted, may indicate that a descriptor was dropped because the LDMAQ 320 was full. The iDMA status register may include a fatal error field, fatal_err, e.g., at bit 3, which may be accessible by a read only and, when asserted, may indicate that the DMA operation was terminated due to the fatal error signal being asserted.

LDMA CCR Register. An LDMA CCR register may be utilized to specify if a CCR $210_0$–$210_{63}$ is to be used for flow control of the LDMA 310 and which one. The LDMA CCR register may have an enable field, E, which may be accessible by both a read and write, e.g., at bit 31, and when asserted indicates that, e.g., a CCR $210_0$–$210_{63}$ will be incremented when a DMA descriptor is removed from the LDMAQ 320. The LDMA CCR register may also have a LDMA CCR designation field, ldma_ccr, which may be accessible by a read or a write, e.g., at bits 5:0, which may be utilized to include the target CCR $210_0$–$210_{63}$ that will be incremented by hardware every time a DMA operation is completed. An iDMA operation will not increment the target CCR $210_0$–$210_{63}$.

LDMA Diagnostic Registers. Each CPU module $100_0$–$100_6$ may be provided with the ability to read the contents of the DMAQ 320, e.g., for diagnostic purposes. This should only be done when DMA is not enabled and not active. There may be 4 registers for each of the 8 possible descriptors that may be stored in the DMAQ 320. These include the DMAQ entry registers $N_0$–$N_3$. The DMAQ entry register $N_0$ may include a message data field, msg_data, e.g., in bits 31:0, that may be read only accessible and normally contains message data that is used in the completion message. For PLB 20-to-PLB 20 transactions this is the source PLB 20 address. The DMAQ entry register $N_1$ may contain a PLB address field, plb_addr, e.g., in bits 31:0, which may be accessible only by a read, and which may contain the value programmed through the LDMA PLB address register for the associated descriptor. The DMAQ entry register $N_2$ may contain a local offset field, local_offset, e.g., in bits 15:0 which may contain the value programmed through the LDMA local offset register for the associated descriptor, as well as a size field, size, e.g., in bits 27:16, which may contain the value programmed through the LDMA size register for the associated descriptor, and a notify field, notify, e.g., at bits 31:28, which may contain, e.g., the lower 4 bits of the value programmed through the LDMA notify register for the associated descriptor. Access to these fields may all be by read only. The DMAQ entry register $N_3$ may contain two notify fields, notify [15:12] and notify [10:4], e.g., respectively at bits 10:7 and 6:0, which represent the contents of LDMA notify register, a type field, type, e.g., at bits 13:11, which may contain the value programmed through the LDMA type register for the associated descriptor, a priority field, pri, e.g., at bits 15:14, which may contain the value programmed through the LDMA PLB priority register for the associated descriptor, a CCR control field, ccr_ctrl, e.g., in bits 20:16, which may contain, the value programmed through the LDMA CRC control register for the associated descriptor, a write pointer field, e.g., at bits 27:24, which may contain an LDMA write pointer, e.g., which indicates the location where the next descriptor will be stored, and a read pointer, rd_ptr, e.g., at bits 31:28, which may contain an LDMA read pointer, which, e.g., indicates the entry at the head of the LDMA. If rd_ptr== wrt_ptr==the LDMA is empty. If the first three LSBs of rd_ptr the first three LSBs of wrt_ptr and the MSB of rd_ptr[3]!=wrt_ptr [3])) then the LDMA is full.

In addition to providing the ability to read the contents of the DMAQ 310, there are registers to provide the current DMA descriptor. If an error occurs during a DMA operation, these registers can be utilized to obtain the DMA descriptor that was being executed when the error occurred. These registers should only be read when the DMA is not active.

An LDMA control diagnostic register may also be provided having an LDMA control diagnostic field, ldma_control_diag, e.g., in bits 31:0, which may be accessible by read only and which contain bits that are defined exactly like the LDMA control register, i.e., with values that reflect the most recently executed DMA operation. An LDMA local offset register may be provided having an LDMA local offset diagnostic field, ldma_local_offset_diag, e.g., in bits 31:0 which may be accessible by a read only and which represent one of the addresses used for the most recent DMA operation, e.g., it can will always be the address that was not written to the PLB address register. An LDMA PLB address diagnostic register may be provided having an LDMA PLB address field, ldma_plb_addr_diag, e.g., in bits 31:0, being accessible by a read only and which can contain the address that was written to the PLB address register for the DMA operation that was most recently completed. An LDMA message diagnostic register may be provided having an LDMA message diagnostic field, ldma_message_diag, e.g., in bits 31:0, which may be accessible by a read only and may contain the completion message data for the DMA operation that was most recently completed.

LDMA Completion Messages. The message type field, mtype, field of the LDMA notify register 368 and the LDMA control register (not shown) may be used to specify the exact format of the completion message. The supported completion message formats may be: type 1, no completion message, zero-length message, e.g., the CCR specified in the mq_num field will be incremented on the local CPU module $100_0$–$100_6$; type 3, 2 word completion message with header followed by message data; type 3, 2 word completion message with header followed by CRC data; type 4, 2 word completion message with message data followed by CRC data; or type 5, 3 word completion message with header followed by message data followed by CRC data, depending on the state of the bits in the mtype field. If a completion message is selected that contains CRC data, the data may be copied from the CRC control register specified by the CRC select bits. This will happen regardless of whether a CRC is actually being calculated. The CRC register could be used to extend the programmable part of the completion message if a CRC is not necessary. The exact format of the various completion message types is discussed below.

LDMA Completion Message Formats. Each of three of the LDMA completion message formats can contain a length field, e.g., in bits 7:0 that can be utilized to define length of the message in four byte words. Each of the message formats can contain a source field, UNIT_CPUXX, e.g., in bits 19:8, within the message, and which can be utilized to identify the source CPU unit CPU $102_0$–$102_6$. The format of this field can be {4'hA,bus_number[3:0], unit_number[3:0]}. For example, $CPU_3$ on the north PLB bus $20_0$ would be 0xA03. The "SLI processor" CPU $102_6$ on the south PLB bus $20_0$ would be 0xA10. Each of the message formats can contain a type field, e.g., in bits 31:20, which may be set up to contain MESG_LDMA_RESP=0xABC for all successful local DMA operations, which indicates, e.g., the message is from a local DMA or MESG_LDMA_ERR_RESP=0xABD for all local DMA operations that encounter an error. One of these three LDMA message completion formats, corresponding to completion message type 2, can contain a DMA response data field, DMA_RESP_DATA, e.g., in bits 63:32, which may contain normally the bits taken directly from the contents of the LDMA message register 352 at the time the descriptor was added to the queue. For PLB 20-to-PLB 20 DMA transactions the lower 16-bits of this field can be taken from the LDMA local offset register 362 and the upper 16-bits can be set to 0. Another of these three LDMA message completion formats, corresponding to completion message type 3, may contain a CRC field, CRC, e.g., in bits 63:32, which can contain the contents of the CRC register 372 {N} at the completion of the DMA operation. N indicates the contents of the crc_sel field of the LDMA CRC control register 372. This occurs whether the CRC calculation is enabled or not. If a completion message type 4 is sent to a variable-length message queue, bits 7:0 of the DMA_RESP_DATA field may be configured to be required to be a 2. The hardware may use these bits as the length field for the message. The third of these three LDMA message completion formats, corresponding to type 5, may contain the DMA_RESP_DATA field in bits 63:32 and the CRC field in bits 95:64. Another of the LDMA completion message formats, corresponding to type 4, may contain the DMA_RESP_DATA field in bits 31:0 and the CRC field in bits 63:32.

CPU Error Register. A CPU error register may be provided to indicate the location where any errors detected in the CPU module $100_0$-$100_6$ are logged. Additional information about the error may be logged in other registers. The CPU error register may contain a fatal mode field, fatal_mode, e.g., at bit 28, that is accessible by a read only and which indicates when set that an error has occurred that is configured to cause the chip 10 to enter fatal mode. The CPU error register may contain a global error interrupt field, global_err_int, e.g., at bit 24, which may be accessible by a read only and, which indicates when set that an error has occurred that is configured to cause a global interrupt. The CPU error register may contain a local error interrupt field, local_err_int, e.g., at bit 20, that is accessible by a read only and which indicates when set that an error has occurred that is configured to cause an interrupt to the local CPU $102_0$–$102_6$. The CPU error register may contain a ram emulation error field, ram_em_err, e.g., at bit 16, that is accessible by a read only and which can indicate when set that there was an illegal access caused by a data cache miss that is stored in a section of data cache designated for RAM emulation, as discussed in more detail below. The CPU error register may contain a data tag parity error field, dtag_perr, e.g., at bit 15, that is accessible by a read only and which can indicate when set that there was a parity error detected in the data cache 106 tag RAM (not shown). The CPU error register may contain a instruction tag parity error field, itag_perr, e.g., at bit 14, that is accessible by a read only and which can indicate when set that there was a parity error detected in the instruction cache 108 tag RAM (not shown). The CPU error register may contain a DMA overflow field, dma_ovfl_err, e.g., at bit 13, that is accessible by a read only and which can indicate when set that a DMA descriptor was dropped due to a write to the LDMA 310 when it was full. The CPU error register may contain a DCache 106 parity error field, dcache_perr, e.g., at bit 12, that is accessible by a read only and which can indicate when set that there was a parity error detected in the data cache 108 data RAM. The CPU error register may contain an ICache 108 parity error field, icache_perr, e.g., at bit 11, that is accessible by a read only and which can indicate when set that there was a parity error detected in the instruction cache 108 data RAM. The CPU error register may contain a DMA PLB error field, $dma_{plb}$_err, e.g., at bit 3, that is accessible by a read only and which can indicate when set that a PLB 20 read error was encountered while performing the DMA operation. All DMA operations will stop when the dma_plb_err bit is asserted. The CPU error register may contain a message frame error field, msg_frame_err, e.g., at bit 4, that is accessible by a read only and which can indicate when set that something illegal was attempted when writing a message. This could be caused from starting a message somewhere other than offset 0, or writing a message that was different than the specified length. The CPU error register may contain a CCR overflow field, ccr_ovfl_err, e.g., at bit 0, that is accessible by a read only and which can indicate when set that a CCR $210_0$–$210_{63}$ overflowed. The CPU error register may contain a CCR underflow field, ccr_undrfl_err, e.g., at bit 1, that is accessible by a read only and which can indicate when set that a CCR $210_0$–$210_{63}$ underflowed. This error cannot be caused by a read/decrement operation. The CPU error register may contain a message queue overflow field, q_ovrfl_err, e.g., at bit 2, that is accessible by a read only and which can indicate when set that a message queue overflowed. The CPU error register may contain an address0 access error field, add0_err, e.g., at bit 5, that is accessible by a read only and which can indicate when set that an access to address 0 was issued to the PLB $20_0$–$20_1$. The CPU error register may contain an IRAM correctable error field, iram_ecc_err, e.g., at bit 6, that is accessible by a read only and which can indicate when set that there was a correctable error detected in an optionally included IRAM (not shown). The CPU error register may contain an DPDR 104 correctable error field, dpdrA_ecc_err, e.g., at bit 10, that is accessible by a read only and which can indicate when set that there was a correctable error detected in the DPDR 104 at port A. The CPU error register may contain a DPDR 104 correctable error field, dpdrB_ecc_err, e.g., at bit 10, that is accessible by a read only and which can indicate when set that there was a correctable error detected in the DPDR 104 at port B. The CPU error register may contain an PLB read error field, cpu_$_{plb}$_err, e.g., at bit 8, that is accessible by a read only and which can indicate when set that a CPU $102_0$–$102_6$ initiated a PLB $20_0$–$20_1$ read transaction that returned data with the error signal asserted. The CPU error register may contain a DPDR collision error field, dpdr_collision, e.g., at bit 7, that is accessible by a read only and which can indicate when set that a CPU $102_0$–$102_6$ initiated a DPDR 104 access was to the same address as a PLB $20_0$–$20_1$ side DPDR 104 access on the same cycle. At least one of the transactions must be a write for the error to be signaled. The address of the collision is logged in a DPDR CPU error register discussed below. The CPU error register may contain a clear error field, clr_err, e.g., at bit 31, that is accessible by a write only and which can indicate when written with a 1, the error conditions will be cleared and normal operations will resume. The clear error bit will not actually be cleared if a new error condition has occurred since the last time the register was read. The clear error bit always returns 0 when read.

CPU Error Enable Register. A CPU error enable register may be provided to enable signaling for the various types of errors detected by the CPU module $100_0$–$100_6$. When a particular type of error detection is disabled, no action will be taken when the error condition is detected, although logging may still occur. Signaling for a particular error can be configured to take the form of a local interrupt, a global interrupt, or a fatal error. All error signaling may be disabled at power up. The CPU error enable register may contain an error enable field, err_en, e.g., at bits 16:0, which may be accessed by a read or a write and which may be utilized to enable a response to a detected error logged in the corresponding bit position of the CPU error register. That is, for each of these bits set to 1, a response is enabled for the corresponding error in bits 16:0 of the CPU error register.

CPU Error Global Interrupt Enable Register. Similarly, a CPU error global interrupt enable register may contain corresponding bits in its bit positions 16:0, which when asserted, the associated error condition will results in a "global" error being issued when the error condition occurs as indicated in the CPU error register. A global error is visible to all processors $102_0$–$102_6$ on the chip 10. The CPU error global interrupt enable register may be set up to have no effect on error conditions that have the error enable bit cleared or the severity bit discussed below asserted. When asserted, for each of the respective bits in the CPU error global interrupt enable register, the associated error condition will result in asserting the error interrupt signal driven to all processors $102_0$–$102_6$ on the chip 10.

CPU Error Severity Register. A CPU error severity register may be provided to enable fatal error signaling for the associated error condition. A fatal error will cause all CPUs $102_0$–$102_6$ in the system 10 to receive an NMI as well as shutting down any additional host DMA and the transmission of any additional packets on the link. Fatal errors may be configured to not be recoverable. Fatal errors may also be configured to only occur for error conditions that have signaling enabled. The CPU error severity register may have an error severity field, error_severity, e.g., in bits 16:0, which may be accessible by a read or a write, and which when asserted, for each respective bit the associated error condition in the corresponding bit position in the CPU error register will result in the chip 10 being put into fatal mode if signaling is enabled for that error, i.e., in the CPU error enable register.

PLB Error Address Register. A PLB error address register may be provided to contain the address of data that was returned from a PLB $20_0$–$20_1$ read with the error signal asserted. The read may have been initiated as the result of a DMA 240 transaction or a CPU request, e.g., either a cache miss or a load. This PLB error address register may be used to log only the first error that occurs since the last clear error operation was completed. The PLB error address register may include a PLB error address field, plb_error addr, e.g., contained in bits 31:4 (with the 4 LSBs set to 0), which may be accessible by a read only and which may contain the PLB $20_0$–$20_1$ address of data that was returned with the error signal asserted.

Message Framing Error Register. A message framing error register may be provided to contain the number of the message queue $202_0$–$202_{31}$ following the detection of a message framing error. A message framing error may be signaled, e.g., if a new message does not start at offset 0 or is not the exact length specified by the length field of the message for a variable-length message or the length specified in the msg_length field of the message queue $202_0$–$202_{31}$ configuration register for fixed-length messages. The message framing error register may include a framing error field, V, e.g., at bit 8, and a queue identification field, qnum, e.g., at bits 4:0, each of which fields may be accessible by read only, and the former being set when a message framing error is detected, and cleared by doing a clear error operation, and the later of which indicating the message queue $202_0$–$202_{31}$ in which the framing error was detected.

Message Overflow Error Register. A message overflow error register may be provided to contain the message queue $202_0$–$202_3$, number for a message queue $202_0$–$202_{31}$ that detects an overflow error. A message overflow may be detected, e.g., if a new message is received and the last word of the message will pass the current location of the head pointer for that message. If the head pointer is advanced prior to completely consuming a new message, parts of the message could be over-written without detecting an overflow error. The overflow error condition may be set up to be only checked at the beginning of a new message based on the advertised length of the message. The message overflow error register may include a message overflow error field, V, e.g., at bit 8 and a queue identification field, qnum, e.g., at bits 4:0, each of which fields may be accessible by read only, and the former being set when a message overflow error is detected, and cleared by doing a clear error operation, and the later of which indicating the message queue $202_0$–$202_{31}$ in which the overflow error was detected.

Cache Error Enable Register. A cache error enable register may be provided to enable parity error detection for the tags and caches. Note that error detection will be disabled at reset and must be enabled by firmware. The cache error enable register may have an ICache 108 tag parity error detection enable field, itag_perr_en, e.g., at bit 3, which may be accessible by a read or a write and which, when asserted, can indicate that parity error detection is enabled for the instruction cache 108 tag RAMs (not shown). The cache error enable register may have a ICache 106 parity error detection enable field, icache_perr_en, e.g., at bit 2, which may be accessible by a read or a write and which, when asserted, can indicate that parity error detection is enabled for the instruction cache 108. The cache error enable register may have an DCache 106 tag parity error detection enable field, dtag_perr_en, e.g., at bit 1, which may be accessible by a read or a write and which, when asserted, can indicate that parity error detection is enabled for the data cache 106 tag RAMs (not shown). The cache error enable register may have a DCache 106 parity error detection enable field, dcache_perr_en, e.g., at bit 0, which may be accessible by a read or a write and which, when asserted, can indicate that parity error detection is enabled for the data cache 106.

Cache Error Seed Register. A cache error seed register may be provided to seed a parity error in the instruction cache 108 and/or data cache 106 and/or in their respective tags. When a bit is asserted in the cache error seed register, the corresponding bit will be inverted on the next write to the targeted RAM array. The cache error seed register will clear itself following a single write. The inverted bit should result in a parity error the next time the location of the targeted device is read. Normally the RAM array will be read within a few cycles of being written. The cache error seed register may include a data tag error mask field, dtag_err_mask, e.g., at bit 20, which may be accessible by a write only and when set forces a parity error on bit 9 of the data cache tag in the cache data tag RAM in the Dcache 106. The cache error seed register may include an instruction tag error mask field, itag_err_mask, e.g., at bit 16, which may be accessible by a write only and when set forces a parity error on bit 9 of the instruction cache tag in the instruction cache 106 tag RAM in the Icache 108. The cache error seed register 410 may include a Dcache 106 data error mask field, ddata_err_mask, e.g., at bits 15:8, which may be accessible by a write only, and which for each asserted bit will force a parity error in the corresponding byte of the instruction cache 108 data RAM. The cache error seed register 410 may include a Icache 108 data error mask field, idata_err_mask, e.g., at bits 7:0, which may be accessible by a write only, and which for each asserted bit will force a parity error in the corresponding byte of the data cache 106 data RAM.

Instruction Cache Error Address Register. An instruction cache error address register may be provided to hold the RAM address where a parity error was detected. The tag and data addresses may be contained in the same register but they may also be independent. The appropriate bits of the CPU error register indicate whether the parity error was detected in the data, tag, or both. The instruction cache error address register may include an instruction cache 108 RAM address field, icache_err_addr, e.g., in bits 14:3, which may be accessible only by a read, and which contains the ICache 108 data RAM address where a parity error was detected. The instruction cache error address register may include an instruction cache 108 tag RAM address field, itag_err_addr, e.g., in bits 30:22, which may be accessible only by a read, and which contains the ICache 108 tag RAM address where a parity error was detected.

Data Cache Error Address Register. A data cache error address register may be provided to hold the RAM address where a parity error was detected. The tag and data addresses may be contained in the same register but they may also be independent. The appropriate bits of the CPU error register indicate whether the parity error was detected in the data, tag, or both. The data cache error address register may include a data cache 106 RAM address field, dcache_err_addr, e.g., in bits 11:3, which may be accessible only by a read, and which contains the DCache 106 data RAM address where a parity error was detected. The data cache error address register may include a data cache 108 tag RAM address field, dtag_err addr, e.g., in bits 27:22, which may be accessible only by a read, and which contains the DCache 106 tag RAM address where a parity error was detected.

DPDR Error Address Registers. The DPDR 104 may be provided with byte error correction coding ("ECC"). When an error is corrected the DPDR 104 address will be logged in a DPDR error address register. Only the first error will be logged. The firmware may be configured to re-arm the logging, e.g., by reading the DPDR error address register and performing a clear error operation. There are two separate error address registers for the DPDR 104. A DPDR PLB error address register may be utilized for errors that occur on the PLB $20_0$–$20_1$ side of the DPDR 104. A DPDR CPU error address register may be provided for errors that are detected on the CPU $102_0$–$102_6$ side of the DPDR 104. Each of the DPDR PLB error address register and the DPDR CPU error address register may include an error address field, dpdr_addr, e.g., in bits 14:3, which may be accessible by a read only and which contain the address in the DPDR 104 that had an error, respectively from the PLB $20_0$–$20_1$ side and the CPU $102_0$–$102_6$ side. The DPDR 104 may not detect (or correct) double bit errors. If a DPDR 104 collision error occurs, the address of the collision will be logged in the DPDR CPU error register. The bottom three bits in each of the DPDR PLB error address register and the DPDR CPU error address register may be set to 0.

RAM Emulation Error Registers. A RAM emulation error register may be provided to detect illegal accesses when using some or all of the Dcache 108 to emulate local RAM, i.e., as an extension of the DPDR 104, as discussed in more detail below. The RAM emulation error register may have a size field, size, e.g., contained in bits 1:0, which may be accessible by a read or a write and may be utilized to specify the amount of Dcache 106 being used for RAM emulation, e.g., none, 1K, 2K or 4K, depending on the state of bits 0:1. A RAM emulation error access register may be provided, having a RAM emulation address field, ram_em_addr, e.g., at bits 31:6, which may be accessible by a read only, and contains the address of the cache line that caused the RAM emulation access violation. If a RAM emulation access error is detected, the ram_em_err error signal will be asserted in the CPU error register. The address of the offending cache miss will be stored in a RAM emulation error address register. The address of the RAM emulation should always start at 0x901c_0000 and extend through the size specified in the RAM emulation error register size field.

CCR Overflow Error Register. A CCR overflow error register may be provided to contain the number of the CCR $210_0$–$210_{63}$ that has experienced an overflow or underflow condition. An overflow can occur, e.g., if a positive value is added to a positive number and the result is a negative number. Or, a negative number may be subtracted from a positive number and the result is negative. An underflow error may be indicated, e.g., a positive number is subtracted from a negative number and the result is a positive number. Or, a negative number may be added to a negative number and the result is a positive number. The CCRs $210_0$–$210_{63}$ may be implemented as 10-bit signed values so the maximum positive number they can hold is 511. The CCR overflow error register may include a CCR overflow field, V, e.g., in bit 8, which may be accessible by a read only and, when set, indicates that a CCR $210_0$–$210_{63}$ underflow or overflow was detected. The CCR overflow error register may also include a CCR identification field, ccr_num, e.g., in bits 5:0, that is accessible by a read only and contains the number of the CCR $210_0$–$210_{63}$ that experienced an underflow or overflow error.

CPU ID Register. Each CPU module $102_0$–$102_6$ may also be assigned a unique ID, e.g., which can be used during the boot process, e.g., to establish a "master processor". The unique ID may also be useful, e.g., for diagnostic reasons. The CPU ID register may include a revision field, rev_id, e.g., in bits 15:12, which may be accessible by a read only and which can be utilized to specify the revision number for the chip. This number may, e.g., will start with 4'd0, and can be incremented by 1 for any chip 10 that has a firmware visible difference. The CPU ID register may also have a unit number field, unit_num, e.g., at bits 9:6, that may be accessible by a read only, and can contain the unit number for the local CPU $102_0$–$102_6$. The CPU ID register may also include a bus identification field, bus, e.g., at bits 11:10, which may be accessible by a read only and which can contain the identity of the PLB bus $20_0$–$20_1$ to which the local CPU $102_0$–$102_6$ is attached.

CPU PLB Priority Register. A CPU PLB priority register may be provided to specify the arbitration priority used for PLB transactions initiated by the Xtensa core of the CPU $102_0$–$102_6$. The default value may be set to 3, which should normally be the desired value. The CPU PLB priority register may contain a priority field, pri, e.g., at bits 1:0, which may be accessible by a read or a write, and which can Specify the priority used when the Xtensa core initiates a PLB transaction, e.g., between one of four possible priorities.

DCR Data Register. A DCR data register may be provided as a PLB $20_0$–$20_1$ configuration register that may be utilized to set PLB $20_0$–$20_1$ parameters, e.g., following a reset. The PLB $20_0$–$20_1$ may be configured such that it cannot be active when using the DCR data register. All CPU modules $100_0$–$100_6$ can contain a DCR data register but they will normally only be connected to the DCR bus only in the SLI processor $102_6$. The CPU $102_0$–$102_6$ can load all the code it needs for driving the DCR into its ICache 108 prior to starting the initialization process. The DCR data register may contain a DCR data field, dcr_data, e.g., in bits 31:0, that may be accessible by a read or a write and be configured such that writes to this field can be configured to result in DCR bus writes of the same data to the address previously stored in a DCR address register.

DCR Address Register. A DCR address register may be provided having a DCR data address field, dcr_addr, e.g., in bits 9:0, that can be accessed by a write only and can contain an address to be utilized for the DCR bus write discussed with respect to the DCR data register.

Scrub Lock Register. A scrub lock register may be provided to lock the local PLB $20_0$–$20_1$ for the purpose of scrubbing a DDR location that has experienced a single-bit error. This lock may be configured to be highly restricted in that the DDR is the only target that is supported while the lock bit is asserted. This means that the scrub operation then must be done by a processor $102_0$–$102_6$ that resides on the same PLB $20_0$–$20_1$ as the DDR controller being scrubbed, i.e., locks are not supported across the bridge 30. Therefore at least one processor $102_0$–$102_6$ on the north PLB bus 200 and one processor on the south PLB bus $20_1$ must be capable of doing the scrub operation. The scrub lock register may include a scrub lock field, L, e.g., in bit 0, which may be accessible by a read or a write, and, when set, indicates that no other device will be allowed to master transactions on the local PLB $20_0$–$20_1$. The only target that is supported when L=1 is the local DDR controller 32. When the scrub lock field bit is asserted it guarantees that no other device will be allowed to master a transaction on the local PLB $20_0$–$20_1$. The process for scrubbing a memory location can involve, e.g., setting the CPU's $102_0$–$102_6$ PLB $20_0$–$20_1$ priority to 3, i.e., writing a 3 to the CPU PLB priority register bits 1:0, writing a 1 to the scrub lock field bit in the scrub lock register, doing any number of read and/or write operations to DDR locations, and then writing a 0 to the scrub lock field bit. While the scrub lock field bit is asserted the CPU module $100_0$–$100_6$ may be configured to not be able to attempt to issue any new DMA operations.

CPU Command Register. A CPU command register may be provided to be accessible via configuration space and the bus/memory interface 110. A CPU command register may be provided as a simple means to pass commands to the CPU $102_0$–$102_6$ from the PLB $20_0$–$20_1$. The CPU $102_0$–$102_6$ can poll this CPU command register via the bus/memory interface 110 without creating traffic on the PLB $20_0$–$20_1$. This may be useful, e.g., in fatal mode. After taking an NMI, the processor $102_0$–$102_6$ could be configured to do nothing but poll this CPU command register, waiting for a message dictating what the processor $102_0$–$102_6$ should do next. For example, it may receive a command to dump the contents of its internal registers. The firmware can be configured to define the actual commands that are possible. The CPU command register may contain a command field, command, e.g., in bits 7:0, that may be accessible by a read or a write and are typically written via configuration space by a third party, e.g., on the chip 10, to issue a command to the CPU $102_0$–$102_6$. Normally this CPU command register would be read-only from the bus/memory interface 110 address and write-only from the configuration address.

CPU Response Register. A CPU response register may be provided as a companion register to the CPU command register. The CPU response register can be used to communicate responses to commands. The CPU response register is typically written from the bus/memory interface 110 and read back through the configuration space. The CPU response register may include a response field, response, e.g., in bits 7:0, which may be accessible by a read or write and is typically written via the bus/memory interface 110 in response to a command issued via the CPU command register.

DDR Configuration Register. A DDR configuration register may be provided to specify the amount of addressable SDRAM that is available. The DDR configuration register should be written as part of the boot process and never changed. The system 10 may be configured such that only $CPU_6$ is connected to the DDR controller 32. In that case, for all other CPUs, i.e., $102_0$–$102_5$ the DDR configuration register will have no effect. The DDR address always starts at offset 0x0 inside, e.g., a 256 MB space allocated in the address map, regardless of contents of this register. If the ddr_size field is set to reflect an addressable region larger than what is populated with SDRAM devices, it could result in hanging up the PLB $20_0$–$20_1$ if an access is attempted to an unpopulated location. The DDR configuration register may have a DDR size field, ddr_size, e.g., at bits 2:0, which may be accessible by a read or a write and which is written following boot to specify the amount of addressable space to use for DDR memory. The supported values for this field may be 256 MB, 128 MB, 64 MB, 32 MB, and unsupported, depending on the state of the bits in the ddr_size field.

Interrupts. Interrupts may be used, e.g., for exception cases and not for mainstream performance cases. In the case where it is desirable to keep all CPU modules $100_0$–$100_6$ identical, most interrupts would be routed to all the CPUs $102_0$–$102_6$. Normally, any given interrupt would only be enabled on a single CPU $102_0$–$102_6$. Interrupts that are generated by the CPU module $100_0$–$100_6$ may be OR'ed together outside the CPU module $100_0$–$100_6$ and then brought back in. This can be utilized to support a CPU $102_0$–$102_6$ interrupting any other CPU $102_0$–$102_6$. There may be other interrupts generated by CPUs $102_0$–$102_6$ that can be driven only to that local CPU $102_0$–$102_6$ and are not visible by other CPUs $102_0$–$102_6$. All interrupts may be configured to do a true interrupt or to simply increment a CCR $210_0$–$210_{63}$ on the local CPU $102_0$–$102_6$. Most interrupts may be configured to be level-sensitive, the exceptions may be a mS interrupt and an sli_reset. The Xtensa core of the CPU $102_0$–$102_6$ is configured to have only 3 interrupt inputs. All the hardware interrupt sources may be mapped to one of the three Xtensa interrupt wires. The Xtensa level 1 interrupt may be used for all interrupts except the debug interrupt, level 2, from the internal logic analyzer and the NMI, level 3, which is driven by the "fatal" signal and the sli_reset. Timer and software interrupts may be generated from inside the Xtensa core. They may be level 1 interrupts but have a different interrupt number than the externally generated level 1 interrupts. Possible interrupt sources are listed in Table I. The "Bit Num" column in Table I refers to the bit position in all interrupt registers outside the Xtensa core. The "Xtensa Num" column refers to the Xtensa core interrupt number used for registers inside the Xtensa core.

TABLE I

| Interrupt Source | Level | Bit Num | Xtensa Num | Description |
|---|---|---|---|---|
| Fatal Error | 3 | 0 | 1 | This signal can be driven programmatically by any CPU or by any number of error detection circuits in the chip. This is used only for serious errors that need immediate containment and/or diagnosis. Fatal Errors are not recoverable. |
| external CPU Error | 1 | 1 | 3 | This interrupt can be asserted programmatically (for test) or by any of the error detection circuits in the CPU module. This signal will be driven externally so that other CPU's can observe it. |
| internal CPU Error | 1 | 2 | 3 | This interrupt can be asserted programmatically (for test) or by any of the error detection circuits in the CPU module. This signal is not driven externally and therefore cannot be observed by other CPUs. |
| Notification Interrupt | 1 | 3 | 3 | This interrupt can be asserted programmatically (for test) or by any of the CCRs that are configured to generate an interrupt. |
| general interrupt 0 | 1 | 4 | 3 | These interrupts are asserted programmatically and are driven to all other CPUs. |
| general interrupt 1 | 1 | 5 | 3 | |
| general interrupt 2 | 1 | 6 | 3 | |
| general interrupt 3 | 1 | 7 | 3 | |
| mS Interrupt | 1 | 8 | 3 | This interrupt is asserted once every mS by hardware. Note that this interrupt is edge-sensitive and must be cleared by writing to the ICR. |
| Buffer Manager Int | 1 | 9 | 3 | This interrupt is driven by the buffer manager when an error is detected. |
| Link Interrupt | 1 | 10 | 3 | |
| Host Interrupt | 1 | 11 | 3 | |
| Serial Port | 1 | 12 | 3 | Interrupt signal from the serial port |
| North DDR Interrupt | 1 | 13 | 3 | This interrupt is driven as when a correctable error was detected in the DDR. |
| South Q/DDR Interrupt | 1 | 14 | 3 | This interrupt is driven when a correctable error was detected in the south DDR (or QDR?) |
| ASSI | 1 | 15 | 3 | Added for future storage product |

TABLE I-continued

| Interrupt Source | Level | Bit Num | Xtensa Num | Description |
|---|---|---|---|---|
| XGN Port Interrupt | 1 | 16 | 3 | Used to signal an exception occurred in the XGN Port |
| frxq Interrupt | 1 | 17 | 3 | Used to indicate an exception in the FRXQ |
| ILA Interrupt | 2 | 18 | N/A | Asserted by the internal logic analyzer. |
| SLI Reset | 3 | 19 | 1 | Asserted by the internal logic analyzer. |
| Timer 0 | 1 | N/A | 0 | Asserted by the Timer inside the Xtensa core |
| Software | 1 | N/A | 2 | Caused when firmware does a WSR write to the Xtensa INTERRUPT register |

Interrupt Enable Register (IER). All interrupts must be enabled via an interrupt enable register that may be accessible from the PLB $20_0$–$20_1$ in order for the CPU $102_0$–$102_6$ to see the interrupt. Each bit of the interrupt enable register may be used to enable the corresponding interrupt source. The interrupt enable register may be cleared by reset so no interrupts will occur until enabled by the firmware. The hardware may OR the value written with the current contents of the interrupt enable register. This can be utilized to avoid the need to do a read-modify-write when setting a single interrupt. The interrupt enable register may have an interrupt field, interrupt, e.g., in bits 18:0, which may be accessible by a read only and a read will return an asserted bit for every interrupt that is currently enabled. The interrupt enable register may also have an interrupt field, interrupt, e.g., in bits 18:0 that is accessible by a write only and the contents of the write can be OR'ed with the data already stored in the interrupt field and the results stored back in the interrupt field of the interrupt enable register.

Interrupt Disable Register (IDR). An interrupt disable register may be used to disable interrupts. The interrupt disable register may be provided to avoid the need to do a read-modify-write when disabling an interrupt. The interrupt disable register may include an interrupt field, interrupt, e.g., in bits 18:0, which may be accessible by a read only and a read will return an asserted bit for every interrupt that is currently enabled. The interrupt disable register may also include an interrupt field, interrupt, e.g., contained in bits 18:0 that is accessible by a write only and any bit position that is written with a 1 will result in the same bit position in the register being cleared for purposes of later being accessed by a read.

Interrupt Active Register (IAR). An interrupt active register may be provided as a read-only register that may be used, e.g., to observe which interrupts are currently being asserted. The contents of this interrupt pending register may be configured to not be affected by the interrupt enable register. The interrupt active register may include an interrupt field, interrupt, e.g., contained in bits 18:0, that may be accessible by a read only and in which a bit may be asserted for every interrupt signal that is high, regardless of whether the interrupt is enabled.

Interrupt Pending Register (IPR). An interrupt pending register may be provided as a read-only register that may be used to observe which interrupts are currently causing the Xtensa core interrupt signal(s) to be asserted. The interrupt pending register may have an interrupt field, interrupt, e.g., in bits 18:0, which may be accessible by a read only and in which a bit may be asserted for every interrupt that is being driven to a 1 and is enabled, therefore causing the Xtensa interrupt signal(s) to be asserted. When servicing an interrupt, all bits in the interrupt pending register should be cleared before returning. This may be done by identifying the source of each interrupt being reported in the interrupt pending register and servicing it or by disabling the interrupt.

Interrupt Assert Register (IAR). An interrupt assert register may be provided to be used to programmatically assert one of the interrupt sources that can be driven by the local CPU $102_0$–$102_6$. Interrupts[3:0] may have other sources so in some cases those interrupts may be asserted without writing to the interrupt assert register. In those cases, the bit may still be a 1 when reading the interrupt assert register regardless of what has been written to the interrupt assert register. The interrupt assert register may have an interrupt field, interrupt, e.g., in bits 8:0, which may be accessible by a write only and the write data will be OR'ed with the contents of the interrupt assert register. Each bit position that has a 1 will cause the corresponding interrupt to be asserted. The interrupt assert register may also have an interrupt field, interrupt, e.g., in bits 8:0, which may be accessible by a read only and a 1 will be returned in every bit position where the corresponding interrupt signal is being asserted. In some cases the interrupt may be asserted as the result of an error or some other condition. The actual source of the interrupt must be resolved before the signal will be read as a zero. Interrupts 2, 3, and 8 may be driven only to the local processor $102_0$–$102_6$ while the other 6 interrupts can be observed by all processors $102_0$–$102_6$.

Interrupt Clear Register (ICR). An interrupt clear register may be provided to be used to force one or more interrupts to the inactive state. Each bit position in the write data that contains a 1 may be used to force the local CPU $102_0$–$102_6$ to stop asserting the corresponding interrupt. When read, the interrupt clear register may be configured to return a 1 in each bit position that the local CPU $102_0$–$102_6$ is driving high. This may be configured to not show interrupts that are being asserted by other devices. The interrupt clear register may have an interrupt field, interrupt, e.g., at bits 8:0, which may be accessible by a write only, and when a bit location is written with a 1, that interrupt can be configured to no longer be able to be programmatically asserted. Interrupts [3:0] may have other sources that could still be issuing the interrupt even after clearing it in the interrupt clear register. The interrupt clear register may also have an interrupt field, interrupt, e.g., in bits 8:0, which may be accessible by a read only and in which a 1 may be returned in every bit position where the corresponding interrupt signal is being driven high by the local CPU module $100_0$–$100_6$. The 1 being asserted may be configured to persist on reads until all sources of the interrupt have been serviced.

Interrupt Configuration Register. An interrupt configuration register may be provided to be used to specify which interrupts result in true interrupts to the local CPU $102_0$–$102_6$ Xtensa core and which will result in a specified CCR $210_0$–$210_{63}$ being incremented. The interrupt configuration register may include a CCR identification field, ccr_num, e.g., in bits 29:24 which may be accessible by a read or a write, and may specify the CCR $210_0$–$210_{63}$ that will be incremented when arbitration notification is enabled. The interrupt configuration register may include a CCR increment field, ccr_inc, e.g., in bits 18:0, which may be accessible by a read or a write and when a bit of the inc_ccr field is asserted, the corresponding interrupt will result in the CCR $210_0$–$210_{63}$ specified by the ccr_num field being incremented. When a bit is cleared, the corresponding interrupt source may be configured to cause a normal interrupt in the local Xtensa core. The respective CCR $210_0$–$210_{63}$ may be configured to only be incremented when the interrupt pending register transitions from zero to non-zero. Additional incoming interrupts may be configured to not cause another increment until the interrupts are all cleared.

Log Message Support. Each CPU module $100_0$–$100_6$ may contain support for sending log messages to the DDR controller 32 with very low firmware overhead. Registers in the CPU module $100_0$–$100_6$ may be utilized to coalesce up to four 32-bit words into a single 128-bit message to efficiently utilize the full width of the PLB $20_0$–$20_1$. The CPU module $100_0$–$100_6$ can be configured to automatically generate the address for the log message and store it, e.g., in a circular queue in DDR memory space. The CPU module $100_0$–$100_6$ hardware can support a mode that will automatically append a 32-bit timestamp to a 96-bit message. The timestamp may be synchronized between all CPUs $102_0$–$102_6$. Each CPU $102_0$–$102_6$ may be configured to write to its own circular queue so there is no need to identify the source of the message. Each CPU $102_0$–$102_6$ may be connected to an internal logic analyzer's trigger mechanism that can be used to enable or disable the issuing of log messages. Log messages may be configured to not use the normal message address space. The timestamp counter may have the ability to increment a CCR $210_0$–$210_{63}$ when it rolls-over. This functionality can be used to notify the firmware so the effective size of the timestamp counter can be extended. If the log message hardware is not being used, this feature can allow the counter to be potentially used for other events that require periodic notification.

Log Message Data Registers. Four data registers may be used to hold the actual message. These registers may reside in the CPU's bus/memory interface 110 register space and may be aliased into two different spaces. A write to the first three log message data registers through the first address space may be configured to only update the targeted register to the new value. A write to the fourth register through the first address space may be configured to update the fourth register and then issue a 16-byte write to the PLB $20_0$–$20_1$ with the contents of all four log message registers. A write to the first two log message data registers through the second address space may be configured to only update the target register. A write to the third log message data register through the second address space may be configured to update the third register and then issue a PLB $20_0$–$20_1$ write with the contents of the first three registers and the contents of the timestamp counter.

Log Message Control Register. A log message control register may be provided to be used to control the behavior of the log message hardware. The log message control register may include a CCR number field, ccr_num, e.g., at bits 29:24, which may be accessible by a read or a write and may be utilized to specify which of the local CCRs $210_0$–$210_{63}$ will be incremented when the timestamp counter rolls-over, assuming notify_en=1. The log message control register may include a notify enable field, notify_en, e.g. in bit 4, which may be accessible by a read or a write and may, when asserted, cause the CCR $210_0$–$210_{63}$ specified in field ccr_num[5:0] to be incremented when the timestamp counter contains a value of 0xFFFF_FFFF.

The log message control register may also include a log enable field, log_en, e.g., at bit 0, which may be accessible by a read or a write and, when asserted, a log message will be issued on the PLB $20_0$–$20_1$ when the "last" log message data register is updated. The log message control register may include a disable on trigger field, dot, e.g., in bit 8, which, when asserted, the log_en bit will be cleared by hardware on the rising edge of a trigger signal from an interrupt logic analyzer ("ILA"). This may disable additional logging of messages. The log message control register may also include an enable on trigger field, eoto, e.g., in bit 12, which, when asserted, the log_en bit will be asserted by hardware on the first rising edge of the trigger signal from the ILA. This can enable logging of messages. The log message control register may also include a queue wrap enable field, wrap_en, e.g., at bit 16, which, when asserted, the log message queue will be allowed to wrap on itself after filling. When cleared, the log_en bit will be cleared once the log message queue is full, stopping additional logging. The log message control register may also include an ILA trigger detected field, trigger, e.g., in bit 20, which can be asserted by hardware when the first rising edge of the ILA trigger signal is detected. The bit may be configured so that it must be reset by the firmware. The log message control register may also include a time stamp counter enable field, cnt_en, e.g., at bit 31, which, when asserted, can enable the timestamp counter to free run.

Log Message Address Register. A log message address register may be provided to be an auto-incrementing register that may be programmed with the address of a circular queue in DDR memory that holds the log messages. The size of the circular queue may be specified via a log message mask register. The log message address register may include a log message address field, log_msg_addr, e.g., in bits 31:4, with the first four LSBs set to 0, which may be accessed by a read or a writ and may be utilized to specify the address in the DDR memory space where the next log message will be stored. The log message address register may be automatically updated by hardware when a new log message is sent on the PLB $20_0$–$20_1$. The address may be forced to be 16-byte aligned to support single cycle transfers on the PLB $20_0$–$20_1$.

Log Message Address Mask. A log message address mask register may be provided to specify the size of the circular queue in DDR memory space. The log message address mask register can support queue sizes between 16K and 16M bytes. Each CPU $102_0$–$102_6$ can be configured to have its own unique queue. The log message address mask register may include a message mask field, msg_mask, e.g., in bits 23:4, with the four LSBs set to 0, which may be accessed by a read or a write, and can be updated to vary the size of the log message queue in DDR memory space. If the field is non-zero, it can be configured to be required to be a string of 1's starting on the right and extending to the left. The more 1's the bigger the circular queue. 0x0→16K queue; 0x1→32K queue; 0x3→64K queue; 0x7→128K queue; etc. The next log message address may be calculated by doing ((addr & ~mask)|((addr+16) & mask)) where addr is the contents of the log message address register and mask is the contents of the log message address mask. Table II lists the registers that can be used for log messages and gives their addresses.

TABLE II

| Address | Register | Description |
|---|---|---|
| 0x1016_0000 | Log Message Data Register 0 | Log Message Data Registers w/o timestamp |
| 0x1016_0004 | Log Message Data Register 1 | |
| 0x1016_0008 | Log Message Data Register 2 | |
| 0x1016_000c | Log Message Data Register 3 | |
| 0x1016_0010 | Log Message Data Register 0 | Log Message Data Registers w/ timestamp |
| 0x1016_0014 | Log Message Data Register 1 | |
| 0x1016_0018 | Log Message Data Register 2 | |
| 0x1016_001c | Timestamp counter | Free running counter at PLB frequency |
| offset 0x950 | Log Message Address Register | Contains the address where the next log message will be stored in DDR |
| offset 0x970 | Log Message Mask Register | Used to set the size of the circular queue in DDR. |
| offset 0x960 | Log Message control Register | Used to enable log messages and other features |

Performance Counter Select Register. A performance counter select register may be provided to be used to select which of the available CPU module $100_0$–$100_6$ countable events are driven out to the a set of 4 counters that can count individual events. The performance counter select register may provide, e.g., multiplexer ("mux") control for each of the 4 different counters as well as for one adder through the utilization of the fields discussed below. The four counters may be shared between all the CPUs $102_0$–$102_6$ as well as other modules on the chip 10. Only one device in the chip 10 may be allowed to use a counter at any given time. The performance counter select register may have a performance adder select field, pa_sel, e.g., at bits 17:16, which may be accessible by a read or a write, and may be used to choose between counting the LDMA_depth (1) or the message length (2). When set to zero, the value to be added can be as passed from another CPU module $100_0$–$100_2$. The performance counter select register may also have a event select field, pcnt_sel[X], where X may be, e.g., 0–3, e.g., respectively in bits 3:0, 7:4, 11:8 and 15:12, which may be accessible by a read or a write, and which may be used to specify what event to count on counter X. The respective counter can be made available to another CPU $102_0$–$102_6$ to count an event.

Debug Address Count Registers. Each CPU module $100_0$–$100_6$ may provide the ability to create countable events when a specific address is executed. There may be, e.g., two debug address count registers that can be provided that can be programmed with an address. When the CPU $102_0$–$102_6$ executes that address an event may be issued to the performance counters, if selected in the performance counter select register. The debug address count registers may need to be configured to only count the rising edge because otherwise the CPU $100_0$–$100_6$ could stall on the instruction. These programmable debug event count registers might be utilized, e.g., to start the counters at a certain address and stop the counters at a different address. While the counters are running they could be used to count, e.g., cache misses or stalled cycles. This could be used to profile the code, e.g., to figure out where all the time is being spend. The debug event count registers may include a count address field, count_addr, e.g., at bits 31:0, which may be accessible by a read or a write and which may contain the address that will cause a countable event, e.g., when the CPU $102_0$–$102_6$ executes the instruction located at that exact address.

Event Register. An event register may be provided to create a countable event under program control. A write to the event register may cause an event for any of the asserted bits, assuming the event register is selected in the performance counter select register. An event may also be used to start or stop the event counters. The event register bits may be cleared by hardware following the creation of the event. The event register may have an event field, event, e.g., in bits 5:0, that may be accessible by a write only, and the bits when asserted may result in a countable event being generated.

Debug Signal Select Register. A debug signal select register may be used to control which debug signals are driven from each CPU $102_0$–$102_6$ to the internal logic analyzer and the external probe signals. The debug signal select register may have a trace address select field, trace_addr_sel, e.g., in bits 3:0, which may be addressable by a read or a write and which may specify where the CPU $102_0$–$102_6$ trace port signals are positioned within the set of debug signals. The debug signal select register may also contain a trace data select field, trace_data_sel, e.g., at bit 4, which may be accessible by a read or a write and which may be used to specify whether the data trace signals are included with the address trace signals. The trace data select field bit may be configured to be only meaningful for some values of trace_addr_sel[3:0].

Debug Signal Select Register. Address trace signals may be defined as {2'b00,Pstatus[5:0],PdebugData[31:0]}. Data trace signals may be defined as {1'b0,Pstatus[12:6],PdebugData[63:32]}. PdebugData and Pstatus are outputs of the Xtensa core trace port and are defined in the Xtensa Data Book. If all the signals are observed, the exact behavior of the Xtensa core can be deduced. The primary purpose of the trace_addr_sel and trace_data_en signals are to control where these signals show up within a set of debug signals. This functionality is provided to support observing multiple CPU cores $102_0$–$102_6$ simultaneously.

CPU Address Map. The chip 10 may have a flat address space. Each CPU module $100_0$–$100_6$ can access the entire address space, including it's own externally visible registers, at the defined address. The CPUs $102_0$–$102_6$ may be configured so that the upper half of the address space is in the cacheable region and the lower half is non-cacheable. All external addresses may be aliased into both halves of the address space. Each CPU $102_0$–$102_6$ may have some local memory that is not visible externally. Each CPU $102_0$–$102_6$ may be configured to see its own local memory at the same address.

External Address Map. Each CPU module $100_0$–$100_6$ may have, e.g., 1 MB of unique host bus adapter address space that is visible on the PLB $20_0$–$20_1$. This space may be divided into, e.g., 5 different areas within the CPU module $100_0$–$100_6$. The five areas are described in Table III.

TABLE III

| Area | Access Type | Description |
| --- | --- | --- |
| Message Queues | Write-only (burst) | Each Message Queue gets 1 KB of address space. New messages must start at offset 0 inside the queue space. |
| Credit count Registers | Read/Write (word) | This space is used primarily by 3$^{rd}$ party CPUs to access the CCR registers. This space is also used for the Notification Configuration Registers since they are physically implemented in the same storage element as the CCR. The exact definition for external CCR addresses is shown in __. |
| DPDR | Read/Write (burst) | PLB transactions that directly access DPDR will use this space. Current thinking is that this space will only be used for diagnostic reasons. The DPDR will normally be accessed via local DMA or the message queues. |
| Debug Log Messages | Write (burst) | This space is defined to handshake write transactions and then toss the data. It is provided exclusively for log messages that are to be captured by the ILA. |
| Configuration Registers | Read/Write (word) | This space provides global access to all the non-CPU core registers (except the CCRs) in the CPU module. Note that even the local CPU will use this space to access the registers. Access to registers via this path is fairly slow and should not be done as part of the performance path. |

PLB $20_0$–$20_1$ accesses to undefined areas of the CPU module $100_0$–$100_6$ address map may not be supported and may, e.g., cause the bus to hang up.

Message Queue Addresses. Each message queue $202_0$–$202_{31}$ on the chip 10 may have its own unique, e.g., 1 KB address range. The data from any write transaction to an address in the message queue range $202_0$–$202_{31}$ may then be put on the respective message queue $202_0$–$202_{31}$. Any write to offset 0 of the message queue $202_0$–$202_{31}$ address range may be assumed to be the beginning of a new message. The system may be configured such that any new message cannot be started until all of the previous messages have been received for that message queue $202_0$–$202_{31}$. Since there are a relatively small number of message queues $202_0$–$202_{31}$ on the chip 10, a 12-bit form of the message queue $202_0$–$202_{31}$ address is may be defined. This format can be used to save storage when dealing with message queue $202_0$–$202_{31}$ addresses. The message queue $202_0$–$202_{31}$ compact address may be defined as a message queue number field, mq_num, e.g., in bits 5:0, which may specify the message queue $202_0$–$202_{31}$ number within the given target unit $100_0$–$100_6$. One of the message queue numbers, e.g., mq_num[5] may always be selected to be 0. The message queue $202_0$–$202_{31}$ compact address may also be defined as a unit number field, unit_num, e.g., in bits 9:6, which can specify the target unit $100_0$–$100_6$ that contains the target message queue $202_0$–$202_{31}$ on the given bus $20_0$–$20_1$. One of the unit numbers, e.g., unit_num[3] may always be set to be 0. The message queue $202_0$–$202_{31}$ compact address may also be defined as a bus field, bus, e.g., at bits 11:10, which can specify the bus $20_0$–$20_1$ that contains the target message queue $202_0$–$202_{31}$. One of the bus numbers, e.g., bus[1] may always be set to be 0. The compact address for the message queue $202_0$–$202_{31}$ expands to a unique 32-bit address using these same fields, in different locations in the 32 address as well as an 8 bit offset field, msg_offset. Only 9 of the 12-bits of the compact address are actually used. The message offset may be configured to always indicate which word of the current message is being transferred. The offset may be configured to be 0 if and only if the data represents the beginning of a new message.

Credit Count Register External Addresses. Similarly, since there are a relatively small number of CCRs $210_0$–$210_{63}$ on the chip 10, a 12-bit form of the CCR $210_0$–$210_{63}$ address may be defined, similar to the message queue $202_0$–$202_{31}$ compact address. This format can also be used to save storage when dealing with CCR $210_0$–$210_{63}$ addresses. The CCR $210_0$–$210_{63}$ compact address may include a CCR number field, ccr_num, e.g. in bits 5:0 of the CCR $210_0$–$210_{63}$ address, which can specify the CCR $210_0$–$210_{63}$ number within the given target unit $100_0$–$100_6$, a unit number field, unit_num, e.g., at bits 9:6 of the CCR $210_0$–$2106_{31}$ which can specify the target unit $100_0$–$100_6$ that contains the target CCR $210_0$–$210_{63}$ on the given bus $20_0$–$20_1$. As above, unit_num[3] may always be 0. The CCR $210_0$–$210_{63}$ compact address may include a bus field, e.g., at bits 11:10 of the compact CCR address. As above, bus [1] may always be 0.

The compact address for the CCRs $210_0$–$210_{63}$ expands to a unique 32-bit address similarly as noted above with the addition of a 2 bit command field, cmd. Only 10 of the 12-bits of the compact address are actually utilized. The CCR cmd field, e.g., in bits the CCR address can be used to indicate the type of operation to perform when accessing the CCR $210_0$–$210_{63}$. Notification control registers may be stored in the same physical location as the CCRs $210_0$–$210_{63}$. The notification control registers may be given a separate address so that they can be updated without affecting the contents of the CCR $210_0$–$210_{63}$. The fields of the NCR addresses are similar to the ones listed above for the CCRs $210_0$–$210_{63}$. Each CPU module $100_0$–$100_6$ may be configured to support a 32K address space for the DPDR 104 of the CPU module $100_0$–$100_6$. The 32K address space for the DPDR 104 of the CPU module $100_0$–$100_6$ may be mapped in a unique location for each CPU module $100_0$–$100_6$ and may be fully accessible from the PLB $20_0$–$20_1$. The composition of the external DPDR 104 addresses can include a DPDR offset field, dpdr_offset, e.g., in bits 14:2 of the DPDR address with bits 1:0 set to 0.

Debug Log Message Space. Each CPU module $100_0$–$100_6$ can support an address space that can be written to without any side effects. This space may be utilized, e.g., to write log messages from the CPU $102_0$–$102_6$ that will be captured by the internal logic analyzer but will not cause any unwanted side effects. Bursts of any size may be supported. This space may be treated as write-only.

Configuration Register Map. The CPU $102_0$–$102_6$ configuration registers are normally configured by the firmware following reset or observed for diagnostic purposes and would normally never change. In some cases these registers may be configured to not be accessible when certain functions are active. These registers may have a unique address for every CPU $102_0$–$102_6$ and may be accessed via the PLB $20_0$–$20_1$ by any on board device or even the host computer connected to the host bus adapter interface 10. Access to these registers may be by way of a 16-bit register bus internal to the CPU module $100_0$–$100_6$ so access is relatively slow. The composition of a possible configuration of the base addresses for the CPU module configuration registers is shown in Table IV.

TABLE IV

| Offset | Register Name | Description |
|---|---|---|
| 0x000 | Head Pointer 0 (HPR0) | Contains a pointer to the beginning of the message for the corresponding message queue |
| 0x010 | Head Pointer 1 (HPR1) | |
| . | . | |
| . | . | |
| 0x1F0 | Head Pointer 31 (HPRR31) | |
| 0x200 | Queue Config 0 (QCR0) | Contains configuration info for message queues |
| 0x210 | Queue Config 1 (QCR1) | |
| . | . | |
| . | . | |
| 0x3F0 | Queue Config 31 (QCR31) | |
| 0x400 | Tail Pointer 0 (TPR0) | Contains the pointer to the tail of each message queue. |
| 0x410 | Tail Pointer 1 (TPR1) | |
| . | . | |
| . | . | |
| 0x5F0 | Tail Pointer 31 (TPR31) | |
| 0x600 | DMA FIFO0 | LDMA FIFO RAM location 0 (4 registers) |
| 0x640 | DMA FIFO1 | LDMA FIFO RAM location 1 (4 registers) |
| 0x680 | DMA FIFO2 | LDMA FIFO RAM location 2 (4 registers) |
| 0x6C0 | DMA FIFO3 | LDMA FIFO RAM location 3 (4 registers) |
| 0x700 | DMA FIFO4 | LDMA FIFO RAM location 4 (4 registers) |
| 0x740 | DMA FIFO5 | LDMA FIFO RAM location 5 (4 registers) |
| 0x780 | DMA FIFO6 | LDMA FIFO RAM location 6 (4 registers) |
| 0x7C0 | DMA FIFO7 | LDMA FIFO RAM location 7 (4 registers) |
| 0x800 | NOP Vector Offset Register | Used to specify the value to be read through the QVPR when no CCR is attempting arbitration. |
| 0x820 | DMA Enable Register | Used to enable DMA operations and to, reset the DMA queue |
| 0x830 | DMA CCR Register | Used to specify the CCR used to track credits for the LDMA |
| 0x840 | CPU Error Register | Tracks error detected in the CPU module |
| 0x850 | CPU Error Enable Register | Used to enable error detection in the CPU module. |
| 0x860 | DPDR PLB Error Address Register | Contains the address of the DPDR PLB-side location where an error was detected |
| 0x870 | Error Severity Register | Used to specify the severity of each error detected in the CPU module. |
| 0x8C0 | Command Register | Used in fatal mode to send a command to the processor. Normally it is write-only in configuration space. |
| 0x8D0 | Command Response Register | Used in fatal mode to communicate the results of a command. Normally it is read-only in configuration space. |
| 0x8E0 | Message Framing Error Register | Contains the message queue number for the queue that detected a framing error. |
| 0x8F0 | CCR Overflow Error Register | Contains the CCR number for a CCR that experiences an underflow or overflow condition. |
| 0x900 | Notify Poll | Contains one bit for each CCR requesting notification |
| 0x940 | Arbitration Group Control Register | Used to specify the priorities and class for each of the four arbitration groups |
| 0x950 | Log Message Address Register | Used to locate the log message queue |
| 0x960 | Log Message Control Register | Used to control the log message features |
| 0x970 | Log Message Mask Register | Used to specify the log message queue size |
| 0x980 | Cache Error seed register | Used to seed errors in the CPU cache and tag RAM |
| 0xA10 | QVPR Stall Enable Register | Contains the enable bit for stalling on QVPR reads with no CCR requesting notification arbitration |
| 0xA20 | Interrupt Enable Register | Used to enable individual interrupts |
| 0xA30 | Interrupt Disable Register | Used to disable individual interrupts |
| 0xA40 | Interrupt Assert Register | Used to issue a local interrupt |
| 0xA50 | Interrupt Clear Register | Used to clear interrupts that have been locally issued. |

TABLE IV-continued

| Offset | Register Name | Description |
|---|---|---|
| 0xA60 | Interrupt Active Register | A read-only register to observe which interrupts are currently being asserted (even if not enabled). |
| 0xA70 | Interrupt Pending Register | A read-only register used to observe which interrupts are currently being asserted and are enabled. |
| 0xA80 | Interrupt Configuration Register | Used to designate interrupts as a true interrupt or to increment a CCR. |
| 0xAA0 | PLB priority register | Used to specify the priority of PLB transactions issued directly from the CPU. |
| 0xAB0 | Message Overflow Error Register | Contains the number of the message queue that experienced an overflow condition |
| 0xAC0 | DPDR CPU error address Register | Contains the DPDR address that detected an ECC error on the CPU side |
| 0xAD0 | PLB Error Address Register | Contains the address of the PLB transaction that experienced an error. |
| 0xAE0 | Data Cache Error Address Register | Contains the data cache/tag address that resulted in a parity error. |
| 0xAF0 | Instruction Cache Error Addr Register | Contains the instruction cache/tag address that resulted in a parity error |
| 0xB00 | Performance Counter Select Register | Used to specify which items to count |
| 0xB10 | RAM Emulation Error Enable Reg | Used to enable error detection for RAM emulation mode. |
| 0xB20 | RAM Emulation Error Address Reg | Used to store the address of the erroneous cache miss when using RAM emulation mode. |
| 0xB30 | Debug Control Register | Used to specify the signals that are brought out of the CPU module for debug purposes. |
| 0xB40 | Cache Error Enable Register | Used to enable cache parity error detection. |
| 0xB50 | Debug Address0 Count Register | Registers used to store the address that creates a countable event when executed by a CPU. |
| 0xB60 | Debug Address1 Count Register | |
| 0xB70 | CPU Error Global Int Enable Register | Used to force error conditions to issue global interrupts. |
| 0xB80 | DDR Configuration Register | Used to on some CPUs to set the amount of addressable SDRAM that is available |

Local Address Map. All memory that is local to the CPU $102_0$–$102_6$, e.g., DPDR 104 and PIF $20_0$–$20_1$ registers, may be mapped into the address space that is reserved for this purpose. The local address map may be the same for all CPUs $102_0$–$102_6$ regardless of the amount of local RAM actually implemented. Addresses in this range may be configured to never be visible on the PLB $20_0$–$20_1$. The system 10 may be configured so that no other device can use this address space, e.g., because the CPUs $102_0$–$102_6$ would not be able to directly address the space, e.g., the transaction could be diverted to local targets and never reach the PLB $20_0$–$20_1$. The CPU $102_0$–$102_6$ can optionally detect an access to location 0x0000_0000 and flag it as an error. This can provide, e.g., a quick detection of the case where firmware attempts to de-reference a null pointer. Each CPU $102_0$–$102_6$ may have a 1 MB block of "local PIF" address space. Transactions to the local bus/memory interface 110 space may be issued on the bus/memory interface 110 by the CPU but may be configured to not be forwarded to the PLB $20_0$–$20_1$ like most bus/memory interface 110 transactions would be. The local bus/memory interface 110 space may be mapped in both the cacheable and non-cacheable regions. These memory spaces are summarized in Table V.

TABLE V

| | Size | Description |
|---|---|---|
| 0x9000_8000 | 32 K | Dual-ported data RAM (uses the XLMI for initial implementation) |

TABLE V-continued

| | Size | Description |
|---|---|---|
| 0x9001_0000 | 64 K | Instruction RAM (not used in initial implementation) |
| 0x9002_0000 | 32 K | XLMI Register space (not used in initial implementation) |
| 0x9010_0000 | 1 MB | Cacheable Local PIF space. |
| 0x1010_0000 | 1 MB | Non-cacheable Local PIF space. |

Local PIF Address Space. The local bus/memory interface 110 address space may be, e.g., a 1 MB region that is local to each CPU $100_0$–$100_6$. This region may be accessible through both the cacheable and non-cacheable address space, e.g., DPDR 104 reads are the only accesses that can be configured for a cacheable access. The local bus/memory interface 110 space may be spit, e.g., into 4 blocks as described in Table VI. Transactions in local bus/memory interface 110 space may be configured to not be visible on the PLB $20_0$–$20_1$, or to the logic analyzer.

TABLE VI

| Area | Access Type | Description |
|---|---|---|
| PIF Message Queues | Write-only | Each Message Queue gets 1 KB of address space. New messages must start at offset 0 inside the queue space. |

TABLE VI-continued

| Area | Access Type | Description |
|---|---|---|
| PIF Registers | Read/Write (word) | This space is used for all the PIF registers as defined in Table VII. The PIF registers do not support access via the cacheable space. Most registers can be read 2 at a time using a 64-bit load TIE instruction. |
| PIF DPDR | Read/Write (burst) | This space provides an internal path to the DPDR without using the Xtensa local Data RAM path. This will be useful if a CPU ever uses an MMU in which case the local data RAM is not supported. This path may also be useful because it is not subject to the collision restrictions in place for DPDR accesses through the local DPDR space. |
| RAM Emulation | Read/Write (burst) | This space is used when using a portion of the data cache to emulate local RAM. Reads to this space will return garbage. Writes will be tossed without side effects. |

PIF Message Queues. The bus/memory interface 110 message queues may be addressed the same way they are from an external address. Messages can be configured to be required to start at offset 0. The first byte of the message can contain the length of the message in words. The message can be, e.g., up to 1K bytes and can, e.g., be delivered in multiple transactions. The message may be configured to not be delivered until the entire message has been written to the bus/memory interface 110 message queue. The format of the bus memory interface 110 message queue address is shown in Table VII. The bus memory interface 110 register addresses may be the same for all CPUs $102_0$–$102_6$.

TABLE VII

| Address | Register Name | Description |
|---|---|---|
| 0x1014_2000 | CCR Indirect Command 0 | Used to read/add to the CCR that won arbitration. |
| 0x1014_2010 | CCR Indirect Command 1 | Used to read/subtract from the CCR that won notification arbitration |
| 0x1014_2020 | CCR Indirect Command 2 | Used to read-decrement/write from the CCR that won notification arbitration |
| 0x1014_2030 | CCR Indirect Command 3 | Used to read-decrement-lock/unlock the CCR that won notification arbitration |
| 0x1014_2040 | NCR Indirect Command 0 | Used to read/write to the NCR that won notification arbitration |
| 0x1014_2050 | NCR Indirect Command 1 | Used to read/write the notify_en bit in the NCR that won notification arbitration |
| 0x1014_2080 | Queue Vector Pointer Register | Contains the pointer to the queue vector for the arbitration winner |
| 0x1014_2084 | Next Head Pointer | A read-only register that contains the pointer to the head of the message queue that is specified in the arbitration results register. |
| 0x1014_2090 | Update Head Pointer | A write-only register that is used to update the value of the head pointer register for the message queue specified in the arbitration results register. |
| 0x1014_2094 | Arbitration Results | Identifies the current winner of notification arbitration |
| 0x1014_2098 | Arbitration Group Enable 0 | Enable Arbitration for Group 0 |
| 0x1014_209c | Arbitration Group Enable 1 | Enable Arbitration for Group 1 |
| 0x1014_20a0 | Arbitration Group Enable 2 | Enable Arbitration for Group 2 |
| 0x1014_20a4 | Arbitration Group Enable 3 | Enable Arbitration for Group 3 |
| 0x1014_2110 | Notification Poll (upper) | Identifies which of the CCRs are attempting notification |
| 0x1014_2114 | Notification Poll (lower) | |
| 0x1014_2118 | Notification Interrupt (upper) | Indicates which of the CCRs are currently issuing an interrupt |
| 0x1014_211c | Notification Interrupt (lower) | |
| 0x1016_0000 | Log Message Data Register0 | Used to write the contents of log messages that do not include a time stamp. |
| 0x1016_0004 | Log Message Data Register1 | |
| 0x1016_0008 | Log Message Data Register2 | |
| 0x1016_000c | Log Message Data Register3 | |
| 0x1016_0010 | Log Message TS Data Register0 | Used to write the contents of log messages that do include a time stamp |
| 0x1016_0014 | Log Message TS Data Register1 | |
| 0x1016_0018 | Log Message TS Data Register2 | |
| 0x1016_001c | Log Message Time stamp Register | Contains a free-running counter that is synchronized between all CPUs. |

TABLE VII-continued

| Address | Register Name | Description |
| --- | --- | --- |
| 0x1016_0100 | CPU Command Register | This register is used when a processor is in fatal mode to send a command from another processor. It is normally read-only from the PIF. |
| 0x1016_0104 | CPU Command Response Register | This register is used when a processor is in fatal mode to respond to commands issued via the cpu command register. It is normally write-only from the PIF |
| 0x1016_0108 | CPU ID | Identifies which CPU this is |
| 0x1016_010C | Scrub Lock Register | Used to lock the PLB when scrubbing a DDR location |
| 0x1016_0140 | LDMA CRC0 Seed Register | Used to store the seed value for the CRC calculation and to read the result |
| 0x1016_0150 | LDMA CRC1 Seed Register | |
| 0x1016_0160 | LDMA CRC2 Seed Register | |
| 0x1016_0170 | LDMA CRC3 Seed Register | |
| 0x1016_0200 | DCR Address | Used to store the address prior to initiating a transaction on the DCR. |
| 0x1016_0204 | DCR Data | Used to initiate a transaction on the DCR. |
| 0x1017_0000 | LDMA PLB Address | Contains the local PLB address field for local DMA operations |
| 0x1017_0004 | LDMA Local Offset | Contains the local offset field for local DMA operations |
| 0x1017_0008 | LDMA Control | Contains the size, type, and notify field for local DMA operations |
| 0x1017_000C | LDMA Message | Contains the data to be sent with the completion message |
| 0x1017_0010 | LDMA Priority | Specifies the PLB arbitration priority to use during the DMA operation |
| 0x1017_0014 | LDMA Type | Contains the type field for local DMA operations |
| 0x1017_0018 | LDMA Size | Contains the size field for local DMA operations |
| 0x1017_001C | LDMA Notify | Contains the notify field for local DMA operations |
| 0x1017_0020 | LDMA CCR Control Register | Controls CRC calculation during local DMA transfers |
| 0x1017_0040 | ILDMA PLB Address | Contains the local PLB address field for local IDMA operations |
| 0x1017_0044 | ILDMA Local Offset | Contains the local offset field for local DMA operations |
| 0x1017_0048 | ILDMA Control | Contains the size, type, and notify field for local DMA operations |
| 0x1017_004C | ILDMA Message | Contains the data to be sent with the completion message |
| 0x1017_0050 | ILDMA Priority | Specifies the PLB arbitration priority to use during the DMA operation |
| 0x1017_0054 | ILDMA Type | Contains the type field for local DMA operations |
| 0x1017_0058 | ILDMA Size | Contains the size field for local DMA operations |
| 0x1017_005C | ILDMA Notify | Contains the notify field for local DMA operations |
| 0x1017_0060 | ILDMA CRC Control Register | Controls CRC calculation during local DMA transfers |
| 0x1017_0070 | IDMA Status Register | Contains the completion status for an immediate DMA operation |

The local CCRs $210_0$–$210_{63}$ may be accessible from the bus memory interface 110. These addresses may be the same for all CPUs $102_0$–$102_6$. The local notification control registers may be accessible from the bus/memory interface 110. These addresses may be the same for all CPUs $102_0$–$102_6$. The DPDR 104 may be 20 KB in size. The DPDR may be mapped in a unique location for each CPU module $100_0$–$100_6$ and may be fully accessible from the bus/memory interface 110. The composition of the PIF DPDR addresses includes a 13 bit offset value, dpdr_offset.

RAM Emulation Addresses. Each CPU module $100_0$–$100_6$ can provide the ability to use some or all of the direct mapped data cache 106 to emulate local DPDR 104 RAM. This mechanism can allow things like the stack and local scratch RAM to be moved from the DPDR 104 to the data cache 106 without creating a large amount of write traffic on the PLB $20_0$ $20_1$ and DDR 32 due to the local data cache 106 being a write-through cache. This mechanism should be used carefully because a data cache 106 miss to an address that overwrites a portion of the data cache 106 being used to emulate local DPDR 104 RAM will result in data corruption. For this reason the CPU module $100_0$–$100_6$ may provide error detection to insure that silent data corruption doesn't occur. The DPDR 104 RAM emulation error detection registers can include a size field size, that can be utilized to configure the size of the ram emulation address space in the cacheable memory. Read transactions issued to RAM emulation address space on the Xtensa's bus memory interface 110 can be configured to immediately return garbage data without initiating a transaction on the PLB $20_0$–$20_1$. Write transactions to this space will handshake properly but then discard the data without initiating a PLB $20_0$–$20_1$ transaction. As a result, the firmware can treat the RAM emulation address space exactly like it does local data DPDR 104 RAM space without adversely impacting system performance, e.g., due to unnecessary traffic on the PLB $20_0$–$20_1$ or worrying about data interference between processors $102_0$–$102_6$. The firmware should be configured to also guarantee that data cache 106 storage being used as local RAM emulation is never used by any other data accesses. One way to accomplish this can be to use the entire data cache 106 for local RAM and all external data accesses can then be done via non-cacheable address space. However, if some amount of data cache 106 is necessary, it is possible to use a portion of the storage for local RAM emulation and a portion for data cache 106 but the location of the data being cached must be carefully controlled so it doesn't overwrite the RAM emulation data.

One possible way to utilize this feature is, e.g., if one half of the data cache 106 was used for the cached literal pool and one half was to be used as local RAM emulation, e.g., for the stack and scratch memory. In this case the local RAM emulation address space can be located in the 2K of address space starting at 0x901c_0000 and extending to 0x901c_07ff. The literal pool could then be located anywhere in the DDR backed address space with the restriction that address bit 11 must be a 1. This can insure that the literal pool will never over write local RAM emulation data space when loaded into the data cache 106. All other Xtensa data accesses should then be through the non-cacheable address space. Also, a 2 should be written to the RAM emulation error register, so that illegal accesses will be detected by hardware. The RAM emulation address space is defined to include a 12 bit offset field, ram_em_offset, e.g., in bits 11:0.

It will be understood from the above description that the system 10 of the present invention may be operated to utilize the cache memory, e.g., the Dcache 106 as a RAM emulation memory space if extra local RAM above and beyond that provided for the DPDR 32 is needed. However, in order to avoid a loss in performance due to unnecessary traffic, e.g., reads and writes on the PLB bus, the operations of the processor and Dcache due to the write through nature of the Dcache 106, must be taken into account. This may be done by assigning a special set of addresses in the cacheable portion of the memory space for each of the processors $102_0$–$102_6$ to use as a cache RAM emulation memory space. When the processor $102_0$–$102_6$ executes, e.g., a write/store operation in the Dcache 106 memory for the respective module $100_0$–$100_6$, there will normally be generated a bus transaction and a DDR transaction for every such operation in the cacheable address space for the processors $102_0$–$102_6$. When the cache RAM emulation is being employed to locally store such temporary data as data in the stack, literals, tables, scratch data, etc., then storage outside of the CPU module $100_0$–$100_6$ is not needed or desirable.

The firmware may establish that only a portion of the direct mapped cache 106 space will be used for RAM emulation, e.g., 1K or 2K, with the remaining, e.g., 3K or 2K, still used as cache. In this event, the error generation will be applicable only to the portion so selected. During compilation also, this configuration may be accounted for by always assigning such things as literals to the lower portion to be utilized as RAM emulation.

The cache memory, e.g., the 4K of direct mapped cache in the Dcache 106 may be made to function exactly like the other local RAM, e.g., the DPDR 32 by designating a portion, e.g., a 4K portion of the cacheable address space used by all of the processors $102_0$–$102_6$ as a RAM emulation block that is set aside and not otherwise utilized as memory, e.g., in the main memory space for the system 10, and mapping the; e.g., 4K of, e.g., the Dcache to that space. The CPU bus/memory interface 110 may be configured to detect the CPU $102_0$–$102_6$, e.g., seeking to determine if an address line in that 4K space is in the Dcache, e.g., in preparation to doing a write/store to that address. On the first such attempt the CPU $102_0$–$102_6$ will determine that the line is not there and perform a read to that location in main memory. The CPU bus/memory interface 110 will decode this read to the set aside RAM emulation memory space, i.e., this space is software visible just like the DPDR, and instead of executing a read to that memory space in main memory, over the PLB bus $20_0$–$20_1$, the bus/memory interface unit will provide bogus data to the CPU $102_0$–$102_6$ and the CPU $102_0$–$102_6$ will then write the bogus data to the mapped address line in the local DCache 106. The processor $102_0$–$102_6$ then can modify that data in this target address space in the local DCache 106 by a normal write/store command, and, subsequently, also can read and write to and from that location in the Dcache 106 local memory, which the CPU will continue to detect as in the Dcache 106 after this initialization process. It will be understood, that the system 10 might be configured to provide for the firmware to cause the CPU bus/memory interface 110 to place the bogus data in the mapped Dcache memory space. The CPU bus/memory interface unit 110 will continue to detect write/stores to this address location and abort the execution of the write/store over the PLB bus $20_0$–$20_1$.

Generally speaking the easiest way to set up this RAM emulation address space mapped to the local Dcache 106 is to use all of the Dcache available space, e.g., the full 4K in the embodiment described in this application. Care must be taken if the entire direct mapped cache is not all used for this local RAM emulation, as data at addresses that will not be stored in the RAM emulation portion of the cache array can be accessed via a cacheable access when operating in such a mode and result in data in the RAM emulation portion of the cache array being overwritten and lost forever. For this reason, the CPU bus/memory unit 110 may also be configured to detect cacheable read/write transactions in the cacheable memory space outside of the set aside 4K RAM emulation space, when RAM emulation is in operation (normally established by the firmware, e.g., at initialization/power up). Such read/write transactions will be flagged as errors, and may also be utilized to cause an interrupt.

It will also be understood from the above that the system 10 according to the embodiment described in this application may provide a very effective task scheduling and management system for the respective CPU $102_0$–$102_6$, e.g., by utilizing the DPDR 104 and hardware assisted task management and scheduling through, e.g., message tracking and task arbitration. Information about the various messages pending in the message queues $202_0$–$202_{31}$ may be tracked, e.g., through the use of the associated CCRs $210_0$–$210_{32}$, and similar task performance information may be contained in the remaining CCRs $210_{32}$–$210_{63}$. Each of the CCRs $210_{32}$–$210_{63}$ may be selected to participate in an arbitration process, e.g., by the firmware. In each of the CCR $210_0$–$210_{63}$ notification control registers may be an indication that the CCR $210_0$– $210_{63}$ is notify enabled and arbitration enabled, in which event the firmware may include the respective CCR $210_0$–$210_{63}$ in the arbitration process. Each such CCR $210_0$–$210_{63}$ will participate in the arbitration process when so designated and when it has a non-negative value in its credit cnt field. The notification control register for each CCR $210_0$–$210_{63}$ may also be utilized to indicate the group to which the CCR is assigned. The firmware assigns to each such group a priority class and a priority number. The firmware then utilizes the group information to arbitrate between CCRs that are active, i.e., have a non-negative, value for credit_cnt.

It will be understood that the credit count value may represent a number of messages waiting in a respective message queue $202_0$–$202_{31}$ or may represent some other task that needs to be scheduled for the processor $102_0$–$102_6$, e.g., the processing of a periodically received timing signal, or the fact that a DMA access transaction has been completed and the result is ready, or the like. It will be also understood that by not participating in arbitration the respective CCR may be idle, or associated with a task that never needs to be selected by arbitration and can, e.g., await the absence of any other CCR seeking arbitration or, alternatively, may be such that whenever active always goes ahead of whatever other CCRs may be selected in the current round of arbitration by the firmware.

The firmware will arbitrate by group first, i.e., if all CCRs CCR $210_0$–$210_{63}$ that are active have the same group number, as indicated in the respective notification control registers, some equal selection algorithm, such as round robin selection, can be applied whenever multiple CCRs of the same group are active. Since in the embodiment disclosed each group is given the same class and the same priority value, the, e.g., round robin selection is all that is needed to arbitrate between CCRs $210_0$–$210_{63}$ assigned the same group number. Since different groups, in the embodiment disclosed, are by definition each given their own unique class and priority number, the arbitration process is carried out by the hardware based on the priority number. It will be understood that other utilizations of the group, class and priority number may be utilized with other possible selection algorithms.

When CCRs $210_0$–$210_{63}$ of different groups are active, the arbitration is based upon the value of the priority number count in the arbitration group control register which can be, e.g., decremented each time the group, i.e., all of the CCRs $210_0$–$210_{63}$ having the same group assignment, fails to win the selection process of the arbitration. That is, when some other group is selected.

When selected this groups priority number count is reset to its original value as contained in the arbitration group control register. This is done under the control of control logic that copies the value from the arbitration control register into an internal hardware temporary register for decrementing. Therefore, e.g., if a group has a priority value of 1 and another group has a priority value of 10, the former group will, ordinarily, be selected and reset to its value of 1 ten times before the other group is decremented to have the equal priority count number and be able, e.g., by round robin selection, to win the arbitration.

The identification of the CCR $210_0$–$210_{31}$ that wins the arbitration is used by the firmware to identify, e.g., a location in a message queue $202_0$–$202_{31}$ where the next message to be processed by the CPU $102_0$–$102_6$ or the next task identified by some other CCR $210_{32}$–$210_{63}$ is to be found. This address can be placed, e.g., in the next head pointer register $296_0$–$296_{31}$ for the respective message queue $202_0$–$202_{31}$. The CPU $102_0$–$102_6$ may then read the content of the queue vector pointer register and the next header pointer register to obtain respectively a location for an instruction to begin processing what is contained in the message and the address of the next message to be processed itself. In this manner an essentially zero wait state memory management within each processor module $100_0$–$100_6$, with the CPU $102_0$–$102_6$ essentially always having a next task to perform ready and waiting and, therefore, need not spend valuable CPU cycles in, e.g., an interrupt or stall while polling locations for the next task to perform and awaiting responses.

It will also be understood that the system 10 according to the embodiment disclosed can enable the CPU $102_0$–$102_6$ to be doing tasks that are pre-prioritized for the CPU by the hardware and firmware and/or do useful work instead of, e.g., waiting for a DMA outside of the respective module $100_0$–$100_6$ to occur. This can be especially beneficial in a system, such as a host bus adapter, where the application tends towards large numbers of tasks with relatively short execution times, e.g., 100 CPU cycles, and where the wait times for, e.g., ordinary DMA transactions may be in the order of 500 CPU cycles.

In operation then the hardware has the ability to do a prioritized selection of one of the, e.g., 64 different task identifiers that are requesting service. The firmware can do a single read of a local register to which the hardware returns a vector that points the firmware to a location where the next task to be serviced, e.g., a message in a message queue $202_0$–$202_{31}$, or a task identified by one of the other CCRs $210_{32}$–$210_{63}$, awaiting service. The firmware can make use of the pre-assigned class and priority of each of the task identifiers assigned, e.g., to one of a plurality of groups, each, e.g., having a class and a priority value, as the guide to selecting the winner of the arbitration. Each task can be associated with one of the CCRs $210_0$–$210_{63}$ and each CCR may have associated with it a number, which when non-negative, and arbitration is enabled, indicates that the CCR $210_0$–$210_{63}$ is asserting a need for service by the respective processor $102_0$–$102_6$. The hardware can then perform the prioritization arbitration selection process among these CCRs with a non-negative value and report a winning task identifier, i.e., the respective CCR $210_0$–$210_{63}$ and report the winning task identifier back to the firmware, e.g., via a register read. The firmware may also directly modify/manipulate the value of any task identifying CCR $210_0$–$210_{63}$. The hardware may also directly modify/manipulate the values for certain events, such as receiving a message, completing a DMA operation, receiving new credits, receiving an interrupt or the log message timestamp counter rolling over.

This is advantageous over the more traditional processing architecture where the CPU must, e.g., interrupt and/or poll to obtain the next task to perform, which is much more expensive to the overall efficiency in terms of wasted CPU cycles. Also an arbitration process implemented entirely in the firmware would take at least an order of magnitude more CPU instruction cycles to execute than the system of the present invention.

It will also be understood that the hardware can be configured by the firmware such that, e.g., different message queues may be assigned for different types of tasks/functionalities, e.g., message queue $202_0$ always can be dedicated to the processing of new incoming fibre packets, such that, e.g., one CPU $102_0$–$102_6$ sending a message to a second CPU $102_0$–$102_6$ may direct that message to a particular message queue $202_0$–$202_{31}$ according to the type of operation that the task relating to the message requires. This can simplify the receiving CPU $102_0$–$102_6$ task management by, e.g., having a pointer to the functionality array associated with each message queue $202_0$–$202_{31}$, so that the CPU $102_0$–$102_6$ can fetch the first instruction to perform the required functionality on the identified message in the identified message queue essentially at the same time as fetching the message. This can be done by reading the current content of the QVPR which is updated each time an arbitration is won to point to the place in the array 294 associated with the particular CCR $210_0$–$210_{63}$. It will also be understood, as noted above that the CCRs $210_0$–$210_{63}$ may be utilized to perform other tasks as well, e.g., tracking the messages in a given queue $202_0$–$202_{31}$ and indicating to a sending CPU $102_0$–$102_6$ whether a receiving CPU $102_0$–$102_6$ can receive a message of a given length from the sending CPU $102_0$–$102_6$ in a given message queue $202_0$–$202_{31}$.

It will also be understood from the above, that the system of the present invention is particularly adapted to an architecture in which a plurality of processors, e.g., in a cascaded and/or parallel processing configuration are in need of passing tasks from one to another in as efficient a manner as possible. The tasks may be embodied, e.g., in special messages sent from one CPU to another, which may be, e.g., stored by the receiving CPU in one of a plurality of specifically identified and categorized message queues $202_0$–$202_{23}$, which usually represent in some fashion (by containing needed data) a particular task for the receiving CPU to perform, i.e., essentially a data pipeline. For example, a message could indicate that the sending CPU $102_0$–$102_6$ is writing to the receiving CPU $102_0$–$102_6$, e.g., in a host bus adapter application, a message packed header that needs further processing, e.g., that the receiving processor may be specifically configured in firmware to perform.

Such messages may, e.g., have a maximum length, e.g., of 1K bytes may be stored in the FIFO message queues $202_0$–$202_{31}$, having also a maximum length, e.g., of 4K bytes. The message queues $202_0$–$202_{31}$ and other task identifiers, e.g., the remaining CCRs $210_{32}$–$210_{63}$ may, e.g., be segregated by type of task, e.g., represented by the messages, e.g., one or more may be always for incoming new fibre channel packets. Messages and other tasks competing for processing service time will accumulate in the system, and the system will need to identify effectively and efficiently from among these the task(s) that most need to be done ahead of others. Rather than wasting time on polling and interrupts in the CPUs $102_0$–$102_6$ themselves, the system is adapted to make the selections necessary in hardware prior to presenting the given tasks, in sequential order to the processor for processing.

The address space for the DPDR 32 is local and quickly accessible and also known to and visible to the firmware. The arbitration logic and registers may be in the CPU bus memory interface unit 110, and be adapted to conduct, e.g., polling and prioritization apart from the CPU. The arbitration groups may mostly be of essentially the same value and one or more groups may be for ultra important tasks or ultra unimportant tasks, usually depending upon the message/task type. When arbitrating between different groups, the group of the higher class will win. In the specific embodiment disclosed each class has a particular prioritization value, so that effectively, it is the prioritization value of each class that determines the task that will win the arbitration selection process each time as between tasks in different groups. As noted the value is actually inverse of the priority, since each group will be selected once its stored priority value decrements to zero and be reset one selected, so that priority value 1 means, ordinarily that group will be selected to win the arbitration ten times before the group with the priority value of 10 is selected to win the arbitration. As one example a group may be selected to have a zero value and will, therefore always be selected until another group(s) reaches zero and then, e.g., a round robin selection algorithm may enable the other group(s) to be selected, e.g., in sequential order from the last group (queue/task identifier) selected to win the arbitration.

In the case where no task is selected, i.e., the QVPR 290 contains no pointer to the array 294 indication the processing required for the nest task and the NHPR 296 points to the location of the task message, e.g., in a message queue $202_0$–$202_{31}$ or associated with a specific other CCR $210_{32}$–$210_{63}$ next head, the QVPR can be configured to stall the processor, e.g., by not returning a data ready signal to the CPU $102_0$–$102_6$. The CPU $102_0$–$102_6$ will then stall and await the presence of the data ready signal, and therefore, advantageously not be itself polling/interrupting looking for work to perform. The stall may also be advantageous from a power consumption standpoint. The QVPR 290, when there is a winner in the arbitration process will always contain the pointer for the last winner, and may be configured to not drop this indicator until the CPU $102_0$–$102_6$, e.g., indicates that the processing of this task is complete, e.g., by attempting a read of the QVPR, in which event the hardware/firmware can be utilized to place the most recent new winner of the arbitration process in the NHPR 296, along with its array 294 pointer in the QVPR 290.

The CCRs, e.g., CCRs $210_0$–$210_{31}$ may be used for other functions in addition to arbitration. The may also be utilized to, e.g., count the number of messages (message space utilized, for unequal length messages) in a given message queue and, e.g., indicating message wrapping has occurred and/or preventing queue overload. For example, the hardware may determine that a message has been received in a message queue $202_0$–$202_3$, and increment the respective CCR $210_0$–$210_{31}$ and, similarly decrement the count in the respective CCR $210_0$–$210_{31}$ when a message is processed by the CPU $102_0$–$102_6$. The CCRs $210_0$–$210_{63}$ may in fact be incremented by any CPU $102_0$–$102_6$ in the system 10. Each CCR $210_0$–$210_{63}$ can be directly linked by the firmware to functionality associated with a location in the array 294.

It is also possible that the firmware may cause the processor $102_0$–$102_6$ to perform tasks without the need for arbitration, e.g., to process all of the messages in a given queue $202_0$–$202_{31}$. In such a case, the CCRs, e.g., CCRs $210_0$–$210_{31}$ may be utilized for the firmware to indicate to the CPU $102_0$–$102_6$ that messages remain in the respective queue.

The CCRs, e.g., CCRs $210_0$–$210_{31}$ may be utilized for message flow control between processors $102_0$–$102_6$. This may be done advantageously utilizing only writes and not reads, e.g., by the receiving CPU $102_0$–$102_6$ writing "credits" into a CCR in the sending CPU $102_0$–$102_6$, e.g., indicating that a certain amount of message space has been opened up in a specific message queue by the CPU writing the credit having processed a message. As an example, the system 10 may be configured so that, e.g., CPUs $102_0$–$102_3$ perform certain task on, e.g., incoming data packets, and always write particular messages types to a particular message queue(s) $202_0$–$202_{31}$ in a particular one of the downstream CPUs $102_4$–$102_6$. In such an event, a CCR $210_0$–$210_{31}$ may always be dedicated to tracking the content of a message queue $202_0$–$202_{31}$, with each upstream CPU $102_0$–$102_6$, with only, e.g., 64 CCRs, still having surplus CCRs for acting, e.g., as other task identifiers for the local CPU. In this manner the sending CPU can be in communication with the receiving CPU, using only writes from the receiving CPU to determine the status of a target message queue $202_0$–$202_{31}$ in a particular one of the downstream CPUs $102_4$–$106_6$. Credits may be sent and received representing number of messages for fixed length messages and representing length of space occupied/freed up for messages of variable length. When the respective CCR $210_{32}$–$210_{63}$ in the sending CPU $102_0$–$102_6$ indicates that not enough credits are available in the target queue in the target CPU $102_0$–$102_6$, the sending CPU $102_0$–$102_6$ can perform other tasks before coming back, when the appropriate number of credits are available to send the message to the target queue $202_0$–$202_{31}$.

Tasks may be selected to not participate in arbitration, e.g., by the associated local CCR $210_0$–$210_{63}$ being set up to not be arbitration enabled, in which event the associated queue $202_0$–$202_{31}$ or CCR $210_{32}$–$210_{63}$ is active, i.e., asserting a task is ready for processing. The particular CCR address selected by the firmware in the writing CPU $102_0$–$102_6$ can also serve to contain a command, e.g., write by adding or by subtracting.

The functionality of the maximum message size that the hardware/firmware will guarantee will not wrap is to eliminate the need for the CPU to check for wrapping for a message of a size less than this value, as indicated, e.g., by the first word of the message. This is at the expense of maintaining message queues that may not be of optimum size from a utilization standpoint, but if the firmware is set up to always use messages of less than this length, then the CPU never has to waste time checking message sizes and locations in the queues for a possible wrap condition and then retrieving the rest of the message if a wrap has occurred.

The present invention is particularly useful in a networked environment, e.g., in a Fibre Channel communication network. There are generally three ways to deploy a Fibre Channel network: simple point-to-point connections; arbitrated loops; and switched fabrics. The simplest topology is the point-to-point configuration, which simply connects any two Fibre Channel systems directly. Arbitrated loops are Fibre Channel ring connections that provide shared access to bandwidth via arbitration. Switched Fibre Channel networks, called "fabrics", yield the highest performance by leveraging the benefits of cross-point switching.

The Fibre Channel fabric works something like a traditional phone system. The fabric can connect varied devices such as work stations, PCS, servers, routers, mainframes, and storage devices that have Fibre Channel interface ports. Each such device can have an origination port that "calls" the fabric by entering the address of a destination port in a header of a frame. The Fibre Channel specification defines the structure of this frame. (This frame structure raises data transfer issues that will be discussed below and addressed by the present invention). The Fibre Channel fabric does all the work of setting up the desired connection, hence the frame originator does not need to be concerned with complex routing algorithms. There are no complicated permanent virtual circuits (PVCs) to set up. Fibre Channel fabrics can handle more than 16 million addresses and thus, are capable of accommodating very large networks. The fabric can be enlarged by simply adding ports. The aggregate data rate of a fully configured Fibre Channel network can be in the tera-bit-per-second range.

Figure 4:
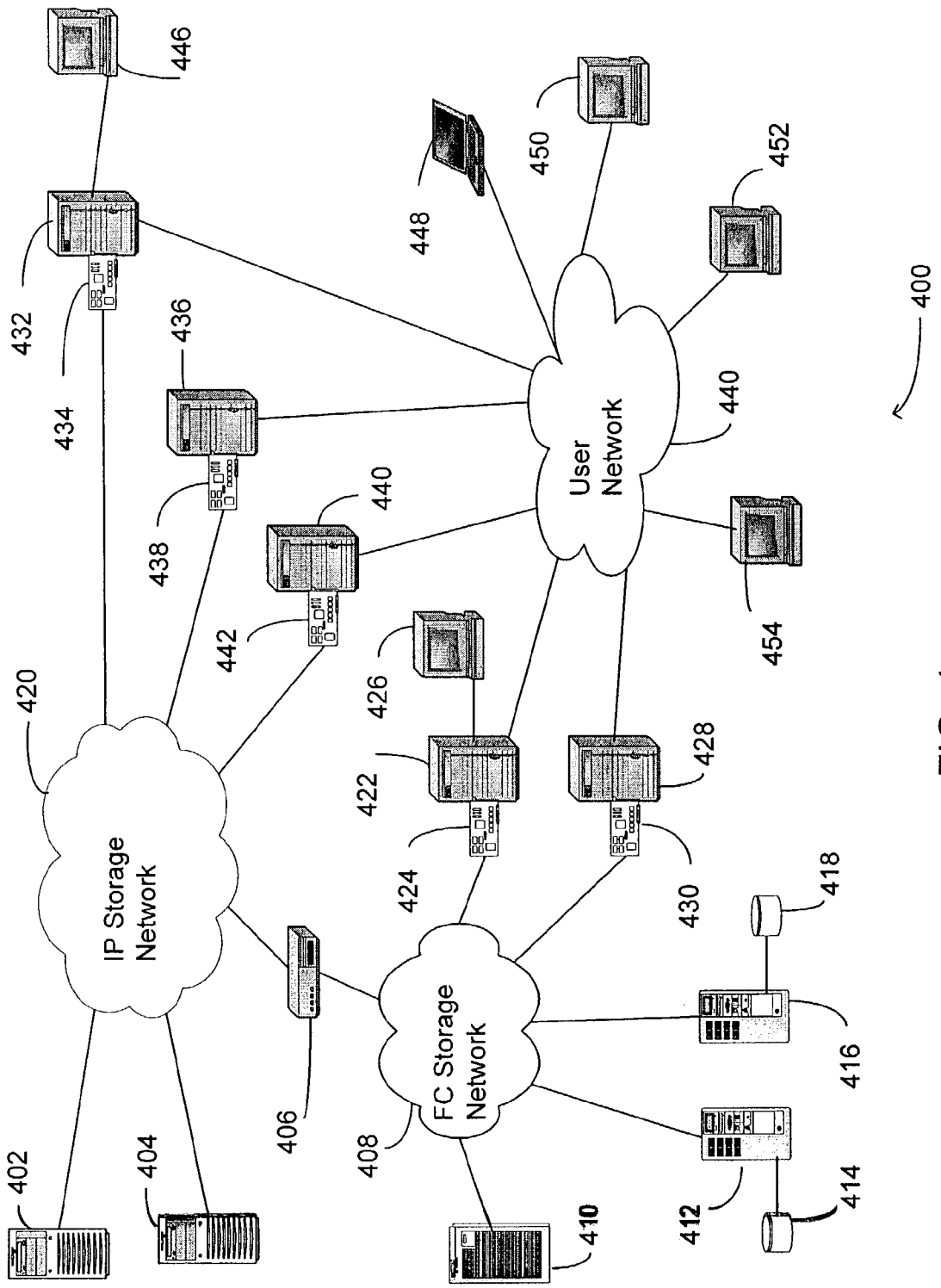
FIG. 4 shows host bus adapters according to an embodiment of the present invention as incorporated into various configurations of communication networks.

Basic types of storage network connections 400 are shown in FIG. 4. In particular, a conventional user network 440 (e.g. a LAN, Ethernet, WAN or the Internet) enables remote laptop 448 and remote computers 450, 452 and 454 to communicate with servers 432, 436, 440, 422, and 428. Fibre channel storage network 408, which may comprise a fabric of switches for connecting devices coupled to the fibre channel storage network, further enables servers 422 and 428 (via fibre channel HBAs 424 and 430) to communicate and share data with storage appliance 410 (e.g. a tape device) and RAID storage systems 412 and 416 (coupled to disk arrays 414 and 418). IP storage network 420, which may comprise a fabric of switches for connecting devices coupled to the IP storage network, further enables servers 432, 436 and 440, via IP HBAs 434, 438 and 442 (e.g. iSCSI HBAs), to interface with IP storage devices 402 and 404 (e.g. iSCSI storage devices). In addition, a switch 406 having a fibre channel port and an IP port enables devices connected to the IP storage network and the fibre channel storage network to interface with each other. The system 10 of the present invention may be included in the HBAs and the target devices (the storage devices connected to the IP and fibre channel networks) in FIG. 4.

It will also be understood from the above that in operation each of the CPUs e.g., $102_0$–$102_6$ may have its own local DMA engine including its own DMA controller 31 and DMAQ 320 which is primarily used, e.g., for moving data into and out of, e.g., the respective local DPDR $104_0$–$104_6$. The other port of the DPDR is connected directly to the respective local processor module $100_0$–$100_6$ CPU $102_0$–$102_6$ and can be directly accessed via load and store instructions from the respective CPU-$102_6$, as if the DPDR were a cache memory without introducing any processor wait states. The LDMA engines can provide a low-overhead method for initiating a local DMA operation. When a processor $102_0$–$102_6$ needs some data it can initiate a local DMA operation to bring the data into the DPDR for use/manipulation by the CPU $102_0$–$102_6$. While the DMA transaction is being processed by the local DMA controller 310 the processor $102_0$–$102_6$ is available for other useful work in parallel with the DMA transaction. Once the DMA transaction is completed by the DMA controller 310 the processor $102_0$–$102_6$ can access the data directly from the DPDR 104 without incurring as much of a performance penalty as if a real cache memory were used and a cache miss occurred and was processed by typical DMA methods. In such a case in the prior art the processor would, e.g., execute a load instruction and the data not being in the cache would cause a cache miss and institute the process to bring the data into the cache. This would cause the CPU to be stalled for the duration of the processing of the cache miss, up to or exceeding 50 CPU cycles for each cacheline miss. Thus, when the processor $102_0$–$102_6$ is processing data occupying many cache lines at the same time, the performance penalty is even further exacerbated. According to an embodiment of the present invention this situation is avoided by the processor $102_0$–$102_6$ programming (writing) an LDMA descriptor to the firmware, which, depending upon which of the staging registers 360, 362, 364, 366, 368, 370 and 372 needs to by updated may take only 10–20 CPU cycles after which the processor $102_0$–$102_6$ is available for other work and is not stalled waiting for a cache miss to be processed. Instead, the necessary data is loaded into the DPDR 104 and the processor 102 informed when it is available as indicated above, e.g., as a message ready for servicing is indicated to the processor 102 by the firmware, i.e., the hardware assisted firmware informs the processor when the LDMA transaction is complete and the needed data ready for the processor 102, e.g. by incrementing an appropriate CCR $210_0$–$210_{63}$ or otherwise sending a message to the CPU, e.g., from the message register 352.

In operation the LDMA PLB address register being written can, e.g., cause a state machine in the firmware to read the contents of the staging registers and write them to the LDMAQ entry registers $N_0$–$N_3$.

The arrangement of an embodiment of the present invention is also well suited for so-called "fire-and-forget" transaction flow management by the hardware assisted firmware, e.g., by utilizing successive LDMAQ 320 entries. For example when a transaction has been initiated by the CPU and an LDMA transaction is being processed and a response message is required, e.g., somewhere outside of the respective module 1000–1006 then the content of the message register of the next succeeding entry 330 in the FIFO of the DMAQ 320 can, e.g., return a credit or the like operation. This is not limited to the DMAQ, but could be utilized with any similar hardware, e.g., some other FIFO to initiate a response or other "fire-and-forget" operation, e.g., where the CPU initiated the transaction but the respective CPU itself is not in need of being informed of the completion of the transaction while some other unit in the system is so in need. As explained the hardware assisted firmware can, e.g., give this notification independently of the respective CPU and without, e.g., occupying the respective DPDR, with the associated cycle time and flow management overhead to the performance of the local module $100_0$–$100_6$, thus avoiding unnecessary synchronized CPU and LDMA operations.

As an example, assuming that the processor 102 needed to perform an operation on a 512 bye block of data. The processor 102 would initiate the LDMA process to acquire this data if not already in the DPDR, consuming only 10–20 cycles, but if handled as a cache miss, with cache lines of, e.g., 64 bytes, the process would have involved 8 cache line misses, and e.g., some 400 CPU cycles or even more, e.g., depending upon other traffic on the pertinent bus(es). Having inqueued the descriptor after only 10–20 cycles the CPU can move on to other awaiting tasks. Once data manipulation is done the LDMA may also be used to move the manipulated data outside of the processor module $100_0$–$100_6$, e.g., to SRAM or to another module's DPDR 104. It can be seen that the arrangement of an embodiment of the present invention is particularly well suited for applications that are repeatedly processing chunks of data that would occupy multiple cachelines, though even a single cache line miss if required to be repeatedly handled is processed with increased efficiency. The CPU, of course, must be efficiently pipelined by the firmware, lest it be stalled pending the completion of the LDMA operation in any event due to lack of useful work pending for servicing by the processor 102.

It will also be understood that the disclosed embodiment of the present invention is well suited to avoiding needed overhead to track wrapping in, e.g., the respective message queues $202_0$–$202_{31}$. this may be accomplished by fixing a length of message which will be assured to never wrap, and also insuring that most if not all messages translating through the system are of this length or less (which may be done in a fixed length or variable length message system). This may be handled, e.g., utilizing the queue configuration register for each of the respective message queues $202_0$–$202_{31}$, part of the CPU configuration registers discussed above. The queue configuration register contains a field msg_size which is set to the size of a message that the system will guarantee never wraps. For fixed length messaging this, may also be the size of the fixed length messages. For variable length messaging the messages may have a header that indicates, e.g., the message size, as well as, e.g., the source and type of message. The size may be indicated by an eight bit field indicating the number of words of some length, e.g., 16 bytes that are in the message. As noted above the next head pointer is contained in the next head pointer register 296, which is indicative of the point in the message queue $202_0$–$202_{31}$ where the next message for the CPU to service is contained. Also as noted above the system includes a tail pointer register, the content of which is indicative of the place to start the loading of the next incoming message to the respective message queue $202_0$–$202_{31}$. In order to prevent wrapping of any message of msg_size or less in length, the firmware may be configured to not allow the tail pointer register to contain the indication of a location within the respective message queue $202_0$–$202_{31}$ that is within msg_size −1 of the end of the respective message queue $202_0$–$202_{31}$ and to instead point to the beginning of the respective message queue $202_0$–$202_{31}$. That is, if the next message is up to msg_size the tail pointer will not be pointing to a location where wrapping would be necessary. It will be understood that if the next message is smaller in size that msg_size −1 it would still not be placed in the last msg_size −1 locations in the respective message queue $202_0$–$202_{31}$, since the tail pointer cannot be located there. Thus, effectively, the message queue $202_0$–$202_{31}$ must be treated by the system, e.g., for credit allocation and use, as if it were actually of a length, e.g., 4K, minus (msg_size −1). Similarly, the system cannot allow the next head pointer to point into this prohibited space either.

It will be understood that if the system is not configured for fixed length and/or the messages are not guaranteed to be less than msg_size in length then wrapping may occur, e.g., if the tail pointer is at msg_size from the end of the respective queue $202_0$–$202_{31}$, and the incoming message is in fact greater in size than msg_size, if that is allowable in the configuration of the system. However, the system will only have to expend the overhead of checking if wrapping has occurred for message management and flow control purposes only when the incoming message is in fact greater in size than msg_size. In all other cases the hardware assisted firmware insures no wrapping has occurred or can occur. For a system configured for fixed length messages the hardware assisted firmware may rely on the message length field in the Queue configuration register and message headers to establish message size are not required.

The foregoing invention has been described in relation to a presently preferred embodiment thereof. The invention should not be considered limited to this embodiment. Those skilled in the art will appreciate that many variations and modifications to the presently preferred embodiment, many of which are specifically referenced above, may be made without departing from the spirit and scope of the appended claims. The inventions should be measured in scope from the appended claims.

I claim:

1. A processor module having a direct memory access (DMA) control apparatus comprising:
    a processor unit for processing data and initiating a generation of one or more local DMA (LDMA) designators upon determining that a portion of the data is unavailable in local memory, and to thereafter continue processing which does not require the unavailable data while waiting for the unavailable data to become available in the local memory;

a LDMA designator holder contained within the processor module and adapted to receive and hold LDMA designator;

a LDMA controller contained within the processor module and communicatively coupled to the LDMA designator holder for receiving the LDMA designator and adapted to carry out a LDMA transaction in accordance with the content of the received LDMA designator to retrieve the unavailable data; and a plurality of staging registers coupled between the processor unit and the LDMA designator holder, each staging register for storing a different LDMA parameter and for writing a portion of a LDMA designator into a selected portion of the LDMA designator holder;

wherein any one or more of the plurality of staging registers is capable of retaining its stored LDMA parameter between successive writings of LDMA designators to the LDMA designator holder when the LDMA parameter is unchanged so that the one or more staging registers need not be rewritten.

2. The apparatus of claim 1:

wherein the LDMA designator holder is adapted to hold a plurality of LDMA designators, each associated with a LDMA transaction and adapted to present each of the plurality of LDMA designators to the LDMA controller successively.

3. The apparatus of claim 2:

wherein the LDMA designator holder is adapted to store the plurality of LDMA designators in a first-in-first-out configuration.

4. The apparatus of claim 3:

wherein the LDMA controller is adapted to transfer contents of the respective plurality of staging registers to the LDMA designator holder when a selected one of the staging registers is written to by the processor unit.

5. The apparatus of claim 4:

wherein the processor unit is adapted to stall if a write to the selected one of the staging registers occurs when the LDMA designator holder is full and to cease the stall when the LDMA designator holders is not full.

6. A computer and communication link interface comprising the processor module of claim 1.

7. An integrated circuit comprising the processor module of claim 1.

8. A host bus adapter card comprising the processor module of claim 1.

9. A processor module having a direct memory access (DMA) control means comprising:

a processor means for processing data and initiating a generation of one or more local DMA (LDMA) designators upon determining that a portion of the data is unavailable in local memory, and for continuing processing which does not require the unavailable data while waiting for the unavailable data to become available in the local memory;

a LDMA designator holding means contained within the processor means for receiving and holding a LDMA designator;

a LDMA controller means within the processor module and communicatively coupled to the LDMA designator holding means for receiving the LDMA designator and for carrying out a LDMA transaction in accordance with the content of the received LDMA designator to retrieve the unavailable data; and a plurality of staging means coupled between the processor means and the LDMA designator holding means, each staging means for storing a different LDMA parameter and for writing a portion of a LDMA designator into a selected portion of the LDMA designator holding means;

wherein any one or more of the plurality of staging means is capable of retaining its stored LDMA parameter between successive writings of LDMA designators to the LDMA designator holding means when the LDMA parameter is unchanged so that the one or more staging means need not be rewritten.

10. The apparatus of claim 9:

wherein the LDMA designator holding means includes means for holding a plurality of LDMA designators, each associated with a LDMA transaction and for presenting each of the plurality of LDMA designators to the LDMA controller means successively.

11. The apparatus of claim 10:

wherein the LDMA designator holding means is adapted to store the plurality of LDMA designators in a first-in-first-out configuration.

12. The apparatus of claim 11:

wherein the LDMA controller means includes means for transferring the contents of the respective plurality of staging registers to the LDMA designator holding means when a selected one of the staging register means is written to by the processor means.

13. The apparatus of claim 12:

wherein the processor means including means for stalling if a write to the selected one of the staging register means occurs when the LDMA designator holding means is full and for ceasing the stall when the LDMA designator holding means is not full.

14. A method for providing local direct memory access (DMA) control comprising:

processing data and initiating a generation of one or more local DMA (LDMA) designators upon determining that a portion of the data is unavailable in local memory, and continuing processing which does not require the unavailable data while waiting for the unavailable data to become available in the local memory;

receiving and storing the LDMA designator;

carrying out a LDMA transaction in accordance with the content of the received LDMA designator to retrieve the unavailable data;

forming each LDMA designator from a plurality of staging registers, each staging register storing a different LDMA parameter and writing a portion of a LDMA designator into a selected portion of the LDMA designator holder; and retaining a value of the LDMA parameter in any one or more of the staging registers between successive writings of LDMA designators when the LDMA parameter is unchanged so the one or more staging registers need not be rewritten.

15. The method of claim 14 further comprising:

receiving and storing a plurality of LDMA designators, each associated with a LDMA transaction, and presenting each of the plurality of LDMA designators successively for carrying out successive LDMA transactions in accordance with the content of the plurality of LDMA designators.

16. The method of claim 15 further comprising:

storing the plurality of LDMA designators in a first-in-first-out configuration.

17. The method of claim 16 further comprising:
transferring the contents of the respective plurality of staging registers to the LDMA designator holder when a selected one of the staging registers is written to.

18. The method of claim 17 further comprising:
stalling the processing of data if a write to the selected one of the staging registers occurs when no more LDMA designators can be stored in the LDMA designator holder, and ceasing the stall when a LDMA designator can once again be stored in the LDMA designator holder.

* * * * *